United States Patent
Barney

(10) Patent No.: US 9,177,349 B2
(45) Date of Patent: *Nov. 3, 2015

(54) METHOD AND SYSTEM FOR RATING PATENTS AND OTHER INTANGIBLE ASSETS

(75) Inventor: Jonathan A. Barney, Newport Beach, CA (US)

(73) Assignee: PATENTRATINGS, LLC, Newport Beach, CA (US)

(*) Notice: Subject to any disclaimer, the term of this patent is extended or adjusted under 35 U.S.C. 154(b) by 666 days.

This patent is subject to a terminal disclaimer.

(21) Appl. No.: 13/092,764

(22) Filed: Apr. 22, 2011

(65) Prior Publication Data

US 2011/0289096 A1    Nov. 24, 2011

Related U.S. Application Data

(63) Continuation of application No. 10/425,554, filed on Apr. 29, 2003, now Pat. No. 7,962,511, which is a (Continued)

(51) Int. Cl.
*G06Q 99/00* (2006.01)
*G06Q 10/10* (2012.01)

(Continued)

(52) U.S. Cl.
CPC .............. *G06Q 99/00* (2013.01); *G06Q 10/10* (2013.01); *G06Q 30/0202* (2013.01);

(Continued)

(58) Field of Classification Search
CPC ..... G06Q 40/06; G06Q 50/184; G06Q 99/00; G06Q 10/10; G06Q 30/0202; G06F 17/30539; G06N 3/02; G06N 5/046

See application file for complete search history.

(56) References Cited

U.S. PATENT DOCUMENTS

| | | | |
|---|---|---|---|
| 4,991,087 A | 2/1991 | Burkowski et al. | |
| 5,175,681 A | 12/1992 | Iwai et al. | |

(Continued)

FOREIGN PATENT DOCUMENTS

| | | |
|---|---|---|
| EP | 1 215 599 | 6/2002 |
| WO | WO 00/75851 | 12/2000 |
| WO | WO 01/35277 | 5/2001 |

OTHER PUBLICATIONS

"Stylized Facts of Patent Litigation: Value, Scope and Ownership," by Lanjouw & Schankerman (Working paper No. 6297) (Dec. 1997). Available at: http://www.nber.org/papers/w6297.*

(Continued)

*Primary Examiner* — Daniel Kinsaul
(74) *Attorney, Agent, or Firm* — Knobbe Martens Olson & Bear LLP

(57) ABSTRACT

A statistical patent rating method and system is provided for independently assessing the relative breadth ("B"), defensibility ("D") and commercial relevance ("R") of individual patent assets and other intangible intellectual property assets. The invention provides new and valuable information that can be used by patent valuation experts, investment advisors, economists and others to help guide future patent investment decisions, licensing programs, patent appraisals, tax valuations, transfer pricing, economic forecasting and planning, and even mediation and/or settlement of patent litigation lawsuits. In one embodiment the invention provides a statistically-based patent rating method and system whereby relative ratings or rankings are generated using a database of patent information by identifying and comparing various characteristics of each individual patent to a statistically determined distribution of the same characteristics within a given patent population. For example, a first population of patents having a known relatively high intrinsic value or quality (e.g. successfully litigated patents) is compared to a second population of patents having a known relatively low intrinsic value or quality (e.g. unsuccessfully litigated patents). Based on a statistical comparison of the two populations, certain characteristics are identified as being more prevalent or more pronounced in one population group or the other to a statistically significant degree. Multiple such statistical comparisons are used to construct and optimize a computer model or computer algorithm that can then be used to predict and/or provide statistically-accurate probabilities of a desired value or quality being present or a future event occurring, given the identified characteristics of an individual patent or group of patents.

22 Claims, 8 Drawing Sheets

Related U.S. Application Data continuation of application No. 09/661,765, filed on Sep. 14, 2000, now Pat. No. 6,556,992.

(60) Provisional application No. 60/154,066, filed on Sep. 14, 1999.

(51) Int. Cl.
  *G06Q 30/02* (2012.01)
  *G06Q 40/06* (2012.01)
  *G06Q 50/18* (2012.01)

(52) U.S. Cl.
  CPC ............. *G06Q 40/06* (2013.01); *G06Q 50/184* (2013.01); *Y10S 707/93* (2013.01); *Y10S 707/99936* (2013.01); *Y10S 707/99937* (2013.01)

(56) References Cited

U.S. PATENT DOCUMENTS

| | | | |
|---|---|---|---|
| 5,392,390 A | 2/1995 | Crozier | |
| 5,461,699 A * | 10/1995 | Arbabi et al. | 706/21 |
| 5,546,529 A | 8/1996 | Bowers et al. | |
| 5,576,954 A | 11/1996 | Driscoll | |
| 5,594,897 A | 1/1997 | Goffman | |
| 5,608,620 A | 3/1997 | Lundgren | |
| 5,615,362 A | 3/1997 | Jensen et al. | |
| 5,625,814 A | 4/1997 | Luciw | |
| 5,640,553 A | 6/1997 | Schultz | |
| 5,642,502 A | 6/1997 | Driscoll | |
| 5,680,305 A | 10/1997 | Apgar, IV | |
| 5,694,592 A | 12/1997 | Driscoll | |
| 5,721,903 A | 2/1998 | Anand | |
| 5,721,910 A | 2/1998 | Unger et al. | |
| 5,754,840 A | 5/1998 | Rivette et al. | |
| 5,774,833 A | 6/1998 | Newman | |
| 5,778,362 A | 7/1998 | Deerwester | |
| 5,781,773 A | 7/1998 | Vanderpool et al. | |
| 5,794,236 A | 8/1998 | Mehrle | |
| 5,799,325 A | 8/1998 | Rivette et al. | |
| 5,808,615 A | 9/1998 | Hill et al. | |
| 5,848,409 A | 12/1998 | Ahn | |
| 5,893,092 A | 4/1999 | Driscoll | |
| 5,926,811 A | 7/1999 | Miller et al. | |
| 5,930,784 A | 7/1999 | Hendrickson | |
| 5,937,402 A | 8/1999 | Pandit | |
| 5,991,751 A | 11/1999 | Rivette et al. | |
| 5,999,907 A | 12/1999 | Donner | |
| 6,009,436 A | 12/1999 | Motoyama et al. | |
| 6,014,663 A | 1/2000 | Rivette et al. | |
| 6,018,714 A | 1/2000 | Risen, Jr. et al. | |
| 6,018,749 A | 1/2000 | Rivette et al. | |
| 6,038,561 A | 3/2000 | Snyder et al. | |
| 6,038,574 A | 3/2000 | Pitkow et al. | |
| 6,049,811 A | 4/2000 | Petruzzi et al. | |
| 6,059,724 A * | 5/2000 | Campell et al. | 600/300 |
| 6,088,692 A | 7/2000 | Driscoll | |
| 6,108,651 A | 8/2000 | Guha | |
| 6,154,725 A | 11/2000 | Donner | |
| 6,175,824 B1 | 1/2001 | Breitzman et al. | |
| 6,182,091 B1 | 1/2001 | Pitkow et al. | |
| 6,202,058 B1 | 3/2001 | Rose et al. | |
| 6,212,530 B1 | 4/2001 | Kadlec | |
| 6,216,134 B1 | 4/2001 | Heckerman et al. | |
| 6,263,314 B1 | 7/2001 | Donner | |
| 6,285,999 B1 | 9/2001 | Page | |
| 6,286,018 B1 | 9/2001 | Pitkow et al. | |
| 6,289,342 B1 | 9/2001 | Lawrence et al. | |
| 6,298,327 B1 | 10/2001 | Hunter et al. | |
| 6,311,173 B1 * | 10/2001 | Levin et al. | 706/21 |
| 6,330,547 B1 | 12/2001 | Martin | |
| 6,339,767 B1 | 1/2002 | Rivette et al. | |
| 6,360,210 B1 * | 3/2002 | Wallman | 705/36 R |
| 6,363,373 B1 | 3/2002 | Steinkraus | |
| 6,389,418 B1 | 5/2002 | Boyack et al. | |
| 6,389,436 B1 | 5/2002 | Chakrabarti et al. | |
| 6,421,066 B1 | 7/2002 | Sivan | |
| 6,430,539 B1 * | 8/2002 | Lazarus et al. | 705/7.31 |
| 6,452,613 B1 | 9/2002 | Lefebvre et al. | |
| 6,453,315 B1 | 9/2002 | Weissman et al. | |
| 6,457,028 B1 | 9/2002 | Pitkow et al. | |
| 6,463,431 B1 | 10/2002 | Schmitt | |
| 6,490,548 B1 | 12/2002 | Engel | |
| 6,526,440 B1 | 2/2003 | Bharat | |
| 6,556,992 B1 | 4/2003 | Barney et al. | |
| 6,560,600 B1 | 5/2003 | Broder | |
| 6,571,241 B1 | 5/2003 | Nosohara | |
| 6,574,632 B2 | 6/2003 | Fox et al. | |
| 6,587,850 B2 | 7/2003 | Zhai | |
| 6,591,261 B1 | 7/2003 | Arthurs | |
| 6,654,767 B2 | 11/2003 | McAnnaney et al. | |
| 6,662,178 B2 | 12/2003 | Lee | |
| 6,665,656 B1 | 12/2003 | Carter | |
| 6,665,670 B2 | 12/2003 | Winer | |
| 6,694,331 B2 | 2/2004 | Lee | |
| 6,735,580 B1 * | 5/2004 | Li et al. | 706/21 |
| 6,751,613 B1 | 6/2004 | Lee et al. | |
| 6,754,873 B1 | 6/2004 | Law et al. | |
| 6,772,149 B1 * | 8/2004 | Morelock et al. | 1/1 |
| 6,829,603 B1 | 12/2004 | Chai et al. | |
| 6,832,211 B1 | 12/2004 | Thomas et al. | |
| 6,879,990 B1 | 4/2005 | Boyer et al. | |
| 6,940,509 B1 | 9/2005 | Crow et al. | |
| 6,996,273 B2 | 2/2006 | Mihcak et al. | |
| 7,010,495 B1 * | 3/2006 | Samra et al. | 705/14.41 |
| 7,054,856 B2 | 5/2006 | Won et al. | |
| 7,089,192 B2 | 8/2006 | Bracchita et al. | |
| 7,092,961 B2 | 8/2006 | Minezaki et al. | |
| 7,099,876 B1 | 8/2006 | Hetherington et al. | |
| 7,106,329 B1 | 9/2006 | Miller et al. | |
| 7,111,002 B2 | 9/2006 | Zhang et al. | |
| 7,188,069 B2 | 3/2007 | Hagelin | |
| 7,194,490 B2 | 3/2007 | Zee | |
| 7,216,100 B2 | 5/2007 | Elliot | |
| 7,228,288 B2 | 6/2007 | Elliot | |
| 7,242,217 B2 | 7/2007 | Van Wageningen et al. | |
| 7,292,994 B2 | 11/2007 | Prokoski | |
| 7,320,000 B2 | 1/2008 | Chitrapura | |
| 7,331,016 B2 | 2/2008 | Williams et al. | |
| 7,433,884 B2 | 10/2008 | Breitzman | |
| 7,536,312 B2 | 5/2009 | Block | |
| 7,546,265 B1 | 6/2009 | Donner | |
| 7,558,749 B2 | 7/2009 | Chen | |
| 7,606,757 B1 | 10/2009 | Poltorak | |
| 7,657,476 B2 | 2/2010 | Barney | |
| 7,676,375 B1 * | 3/2010 | Neifeld et al. | 705/310 |
| 7,962,511 B2 | 6/2011 | Barney | |
| 2001/0020229 A1 * | 9/2001 | Lash | 705/3 |
| 2001/0034686 A1 | 10/2001 | Eder | |
| 2002/0002524 A1 | 1/2002 | Kossovsky et al. | |
| 2002/0004775 A1 | 1/2002 | Kossovsky et al. | |
| 2002/0022974 A1 | 2/2002 | Lindh | |
| 2002/0035499 A1 | 3/2002 | Germeraad et al. | |
| 2002/0046038 A1 | 4/2002 | Prokoski | |
| 2002/0077835 A1 | 6/2002 | Hagelin | |
| 2002/0082778 A1 | 6/2002 | Barnett et al. | |
| 2002/0087442 A1 | 7/2002 | Reader | |
| 2002/0099637 A1 | 7/2002 | Wilkinson et al. | |
| 2003/0036945 A1 | 2/2003 | Del Vecchio et al. | |
| 2003/0065658 A1 | 4/2003 | Matsubayashi et al. | |
| 2003/0126054 A1 | 7/2003 | Purcell, Jr. | |
| 2003/0212572 A1 | 11/2003 | Poltorak | |
| 2004/0010393 A1 | 1/2004 | Barney | |
| 2004/0068453 A1 | 4/2004 | Duan et al. | |
| 2004/0103112 A1 | 5/2004 | Colson et al. | |
| 2004/0122841 A1 | 6/2004 | Goodman et al. | |
| 2005/0021434 A1 | 1/2005 | D'Loren | |
| 2005/0071174 A1 | 3/2005 | Leibowitz et al. | |
| 2005/0149420 A1 | 7/2005 | Hagelin | |
| 2006/0036452 A1 | 2/2006 | Williams | |
| 2006/0036453 A1 | 2/2006 | Williams | |
| 2006/0036529 A1 | 2/2006 | Williams | |
| 2006/0036632 A1 | 2/2006 | Williams | |

(56) References Cited

U.S. PATENT DOCUMENTS

| | | |
|---|---|---|
| 2006/0036635 A1 | 2/2006 | Williams |
| 2006/0074867 A1 | 4/2006 | Breitzman |
| 2007/0073625 A1 | 3/2007 | Shelton |
| 2007/0073748 A1 | 3/2007 | Barney |
| 2007/0088738 A1 | 4/2007 | Barney et al. |
| 2007/0094297 A1 | 4/2007 | Barney |
| 2007/0150298 A1 | 6/2007 | Barney |
| 2007/0208669 A1 | 9/2007 | Rivette et al. |
| 2007/0226094 A1 | 9/2007 | Malackowski et al. |
| 2008/0091620 A1 | 4/2008 | Vollenweider et al. |
| 2009/0259506 A1 | 10/2009 | Barney |
| 2009/0307014 A1 | 12/2009 | Block |
| 2010/0094781 A1 | 4/2010 | Barney |

OTHER PUBLICATIONS

"Empirical Evidence on the Validity of Litigated Patents," by Allison & Lemley. IN: AIPLA Quarterly J'nl, vol. 26, p. 185 (Jul. 1, 1998). Available at: http://papers.ssrn.com/sol3/papers.cfm?abstract_id=118149.*

"Predicting Takeover Targets," by Palepu, Krishna. IN: J'nl of Accounting and Economics 8 (1986) 3-35. Availablet at: Elsevier Science Pub.*

"Rule-based Machine Learning Methods for Functional Prediction," by Weiss & Indurkhya. IN: J'nl of Artificial Intelligence Research 3 (1995) pp. 383-403. Available at: http://arxiv.org/pdf/cs/9512107v1.pdf.*

"Logistic Regression Analysis," by Dayton, Mitchell. IN: Dept. Measurement, Statistics & Evaluation, U. Maryland (1992). Available at: http://bus.utk.edu/stat/datamining/Logistic%20Regression%20Analysis%20(Dayton).pdf.*

"How to Count Patents and Value Intellectual Property: Uses of Patent Renewal and Application Data," by Lanjouw et al. IN: NBER Working Paper Series (1996).*

"The Rate of Obsolescence of Patents, Research Gestation Lags, and the Private Rate of Return to Research Resources," by Pakes & Shankerman. IN: R&D, Patents, and Productivity (Svi Griliches ed., 1984).*

"Report to Congress on the Depreciation of Horses," by Dept. Treasury (1999). Available at: http://www.treasury.gov/resource-center/tax-policy/Documents/depreci8study_horses.pdf.*

Joshua Lerner, "The Importance of Patent Scope: An Empirical Analysis", The RAND Journal of Economics, vol. 25, No. 2 (Summer, 1994), pp. 319-333 http://www.jstor.org/stable/2555833.

Dietmar Haroff, Frederic M. Scherer, Katrin Vopel, "Citations, Family Size, Opposition and the Value of Patent Rights", Sep. 1999.

Email communications regarding the possible publication date of "The Quality of Ideas: Measuring Innovation With Multiple Indicators" reference (w7345).

Yao Li, "Borders and Distance in Knowledge Flows: Dying Over Time or Dying With Age?—Evidence From Patent Citations", CESifo Area Conference on Global Economy, Jan. 25-26, 2008.

Rufus Pollock, "Exploring Patterns of Knowledge Production", University of Cambridge, May 2009.

Elizabeth A. Leicht, "Methods and Applications for Detecting Structure in Complex Networks", A Dissertation Submitted in Partial Fulfillment of the Requirements for the Degree of Philosophy (Physics) in the University of Michigan 2008.

Csardi et al., "Modeling innovation by a kinetic description of the patent citation system", Article in Press, ScienceDirect Apr. 4, 2006.

Ariel Pakes, "Patents as Options: Some Estimates of the Value of Holding European Patent Stocks", NBER Working Paper Series, Working Paper 1340, National Bureau of Economic Research, Apr. 1984.

Katherine J. Strandburg, Kinetics of the Patent Citation Network: A Physics Approach to understanding the Patent System:, DePaul University College of Law and University of Illinois College of Law (visiting Fall 2005).

Deitmar Harhoff, Francis Narin, Frederic M. D, Katrin Vopel, "Citations Frequency and the Value of Patented Innovation", Nov. 1997.

Deitmar Harhoff, Frederic M. Scherer, Katrin Vopel, "Citations Frequency and the Value of Patented Inventions", Discussion paper 97-27, Aug. 1999.

Gregory P. Daines, "Patent Citations and Licensing Value", Submitted to the Sloan School of Management in Partial Fulfillment of the Requirements for the Degree of Master Business Administration at the Massachusetts Institute of Technology, Jun. 2007.

Jean Olson Lanjouw and Mark Schankerman, "Stylised Fact of Patent Litigation: Value, Scope and Ownership", The Toyota Centre, Jan. 1998.

Barron, Russell J. "Better Accounting for Patent Portfolios" Legal Times, Oct. 16, 2000, pp. 91-92.

Los Angeles Times, "Marketplace of Ideas: Selling Patents Online." Oct. 25, 1999, Section C.

Malki, Elli "Intellectual Property Intensity (IPI) and the Value-Growth Effect." Nov. 12, 1997.

Jaffe, Adam B., et al., "International Knowledge Flows: Evidence from Patent Citations." National Bureau of Economic Research. Cambridge, MA. Apr. 1998.

Lanjouw, Jean O., et al. "The Enforcement of Intellectual Property Rights: A survey of the Emperical Literature." National Bureau of Economic Research. Cambridge, MA. Dec. 1997.

Khan, B. Zorina, "Legal Monopoly: patents and Antitrust Litigation in U.S. Manufacturing, 1970-1998." National Bureau of Economic Research Cambridge, MA Apr. 1999.

Cockburn, Iain, et al., "Industry Effects and Appropriability Measures in Stock Market's Valuation of R&D and Patents," National Bureau of Economic Research, Cambridge, MA Dec. 1987.

Hall, Bronwyn H. "Innovations and Market Value," National Bureau of Economic Research, Cambridge, MA. Feb. 1999.

Hirschey, M., V.J. Richardson and S. Scholz "Value Relevance of nonfinancial Information: The Case of Patent Data," (Jan. 1998) Available at SSRN: http//ssrn.com/abstract63589 or doi: 10.2139/ssrn.6389.

Allison, J.R. and M.A. Lemley "Empirical Evidence of Patent Validity," AIPLA Quarterly Journal, vol. 28 No. 3, pp. 187-275. 1998.

Bramson, Robert S. "Valuing Patents, Technologies and Portfolios: Rules of Thumb." Website: www.ventius.com May 1, 2000.

Trippe, Anthony, "Software Tools for Analyzing Patents," Website www.tripp.EPSILON.go-concepts.com, Apr. 1999.

Rivette, Kevin G., et al. "Discovering New Value in Intellectual Property." Harvard Business Review Jan.-Feb. 2000.

Hall, Bronwyn H. Market Value and Patent Citations: A First Look: May 2001.

Garson, G.D. Multiple Regression http://www.2.chase.ncsu.edu/garson/pa765/regress.htm Dec. 13, 2001. pp. 2-24 only.

"Survey on Solutions to Prior Art Searching" Internet Patent News Service Jun. 30, 1999.

Neifeld, Richard A., "A Macro-economic Model Providing Patent Valuations and patent Based Company Financial Indicators," 83 J. Pat. & Trademark Off. Soc'y 211 (Mar. 2001).

KMPG Peat Marwick LLP, Freewing Aerial Robotics Corporation Determination of Fair Market Value Jun. 1, 1997.

"Bond Rating," Printout from unknown website. 1997.

"Patent Claim Analysis." Site Hawk Date Unknown.

McGavock, Daniel M. of IPC Group, Inc. Assessing the Value of your Client's Intellectual Property Rights for Licensing, Sale or Litigation. Presentation for Knobbe, Martens, Olson & Bear, LLP. Sep. 27, 1999.

Allison, J.R., M.A. Lemley, K.A. Moore and R.D. Trunkey "Valuable Patents", Boat Working Papers in Public Law, Paper 28, 2003.

Neifeld, R.A. "Patent Valuation from a Practical View Point, and Some Interesting Patent Value Statistics from the PatentValuePredictor Model", PatentCafe Magazine, downloaded from www.PatentCafe.com , Apr. 14, 2004.

Buchanan, J.M. "Patent Rankings: The Numbers Game v. Patent Quality", blog post, downloaded from www.rethinkip.com, Apr. 20, 2005.

Parchomovsky, G. and R.P. Wagner "Patent Portfolios", University of Pennsylvania Law Review, vol. 154, No. 1, Nov. 2005. Available at SSRN: http://ssrn.com/abstract=874445 or DOI: 10.2139/ssrn.582201.

(56) References Cited

OTHER PUBLICATIONS

Hou, J-L. and H.Y. Lin "A Multiple Regression Model for Patent Appraisal", Industrial Management & Data Systems, vol. 106, No. 9, 2006, pp. 1304-1332.
"Individual Inventors." Website: www.pl-x.com.
"The Black and Scholes Model." Reprint from unknown source.
Pitkethly, R. "The Valuation of Patents: A Review of Patent Valuation Methods with Consideration of Option Based Methods and the Potential for Further Research", Judge Institute Working Paper WP Dec. 1997.
U.S. Patent and Trademark Office, Board of Patent Appeals and Interferences. Ex parts Donnor. No. 96-2552, Decided Mar. 26, 1999. 53 USPQ2d, pp. 1699-1702.
Thomas, Patrick "The Effect of Technological Impact upon Patent Renewal Decisions", Technology Analysis & Strategic Management, 11:2, 181-197, 1999, as downloaded on Dec. 2, 2009.
Lanjouw, et al., "The Quality of Ideas: Measuring Innovation With Multiple Indicators", NBER Working Paper Series, Working Paper 7345, http://www.nber.org/papers/w7345, National Bureau of Economic Research, Sep. 1999.
Jean Olson Lanjouw and Mark Schankerman, "Stylised Fact of Patent Litigation: Value, Scope and Owndership", Jan. 1998, LSE STICERD Research Paper No. EI 20, http://sticerd.lse.ac.uk/dps/ei/ei20.pdf.
"Patent Café Website of Satisfy the Inventor's Heartlest Appetite," Desert Mailer News. Sep. 21, 1999.
"The Open Platform for Intellectual Property Asset Management" AURGIN products pamphlet for Aureka 7.0 software. 1999.
Willigan, Walter L "Leveraging Your Intellectual Property: A Proved Path to Value Extraction" Dec. 1998.
"Calculation of Indicated Market Value" TRRU IP Valuation Report Dec. 14, 2000.
Patent Evaluation Index, The Japan Technomark Foundation (Mar. 2000).
Heiden, Bowman J., "The Microeconomi Asset Value of a Patent: An Empiracle Study of Highly valuable Swedish-owned Patents," Center for Intellectual Property Studies Dept. of Industrial Management & Economics, Chalmers University of Technology (Apr. 2001).
United States Patent & Trademark Office, FY 2000 USPTO Annual Report.
American Intellectual Property Law Association, Report of Economic Survey, pp. 63, Table of Contents Only (1999).
Smith & Par, Valuation of Intellecutal Property and Intangible Assets, $2^{nd}$ Ed (1989) Table of Contents and Index Only.
Savikas, "Survey Lets Judges Render Some Opinions About the Patent Bar," Nat'l L.J., Jan. 18, 1993 at 57.
AIPLA., "Report of Economic Suervey" (1991) Table of Contents Only.
"The Anatomy of Large-Scale Hypertextual Search Engine," by Sergey Brin and Lawrence Page, Apr. 1, 1998.
Mark A. Lemley, et al., Valuable patents, 92 Georgetown Law Journal 435 (2004).
Hoffman T. "Learning the Similarity of Documents: An Information-Geometric Approach to Document Retrieval and Categorization," ANIPS, v. 12, pp. 914-920, MIT Press, 2000.
"Intellectual Property," Website: www.edtn.com. Feb. 15, 1999.
Malki, Elli "Intellectual Property and the Valuation of Biotechnology Companies: GEN-dex versus Dow Jones." 1997.

Grilliches, Zvi. "Patent Statistics as Economic Indicators: A Survey Part I." National Bureau of Economic Research. Cambridge, MA. Mar. 1990.
Lanjouw, Jean O., et al. "Stylized Facts of Patent Litigation: Value, Scope and Ownership." National Bureau of Economic Research. Cambridge, MA. Mar. 1990.
Lanjouw, Jean O., et al. "How to Count Patents and Value Intellectual Property: Uses of Patent Renewal and Application Data." National Bureau of Economic Research. Cambridge, MA. Jul. 1996.
Aurigin Systems, Inc. Aureka Cite Module 1998.
Lanjouw, Jean O., et al. "Stylized Facts of Patent Ligation." National Bureau of Economic Research. Cambridge, MA. Oct. 1999.
Reitzig, Markus "Improving Patent Valuation Methods for Management Validating Indicators by Understanding Patenting Strategies" Oct. 2001.
McCornack, R. L. "A Comparison of Three Predictor Selection Techniques in Multiple Regression", Psychometrika, vol. 35. No. 2, Jun. 1970, pp. 257-271.
Schankerman, M. and A. Pakes "Estimates of the Value of Patent Rights in European Countries During the Post-1950 Period", NBER Working paper No. 1650, Jun. 1985.
van der Drift, J. "Statistics of European Patents on Legal Status and Granting Data", World Patent Information, vol. 10, No. 4 May 3-5, 1988, pp. 243-249.
Trajtenberg, M. "A Panny for Your Quotes: Patent Citations and the Value of Innovations", RAND Journal of Economics, vol. 21, No. 1, Spring 1990, pp. 172-181.
Griliches, Z. "Patent Statistics as Economic Indicators: A Survey", Journal of Economic Literature, vol. 28, No. 4, Dec. 1990, pp. 1661-1707.
Albert, M.B., D. Avery, F. Narin and P. McAllister "Direct Validation of Citation Counts as Indicators of Industrially Important Patents", Research Policy, vol. 20, 1991, pp. 251-259.
Putnam, J.D. "The Value of International Patent Rights", Ph.D. dissertation, Yale University, May 1996.
Narin, F. "Tech-Line Background Paper", CHI Research, Inc., Aug. 19, 1998.
Deng, Z. B. Lev and F. Narin "Science and Technology as Predictors of Stock Performance", Financial Analysis Journal vol. 55, No. 3, May/Jun. 1999, pp. 20-32.
Lanjouw, J.O. and M. Schankerman "Stylized Facts of Patent Litigation", slideshow, presentation at the National Academy of Sciences Board on Science, Technology and Economic Policy (STEP) Conference, Feb. 2-3, 2000.
Kohoen, T., S. Kaski, K. Lagus, J. Salojarvi, J. Honkela, V. Paatero and A. Saarela "Self Organization of a Massive Document Collection", IEEE Transactions on Neutral Networks, vol. 11, No. 3, May 2000, pp. 574-585.
Lanjouw, J.O. and M. Schankerman "Characteristics of Patent Litigation: A Window on Competition", RAND Journal of Economics, vol. 32, No. 1, Spring 2001, pp. 129-151.
Barney, J.A. "A Study of Patent Mortality Rates: Using Statistical Survey Analysis to Rate and Value Patent Assets", AIPLA Quarterly Journal, vol. 30, No. 3, pp. 317-352, (2002).
Kim, A.D., N.W. Partee, T.J. Reynolds and M.A. Santamaria "Patent Litigation Risk-Scoring Model", Proceedings of the 2002 IEEE Systems and Information Design Symposium, 2002, pp. 13-17.
Winkless, B., B. O'Connor and J. Cooney Invention Quality Measurement (IQM) 1. Patent Valuation: The Methods that TRIZ Forgot:, The TRIZ Journal, downloaded from www.triz-journal.com, Sep. 2003.

\* cited by examiner

U.S. Patent Rating Report

| | | | |
|---|---|---|---|
| Patent No.: | 5,555,555 | Title: | NEW INVENTION FOR DOING SOMETHING GREAT |
| Inventor: | Jane E. Smith | | |
| Filed: | August 3, 1995 | | |
| Issued: | June 13, 1996 | | |
| Assignee: | XYZ Company, Inc. | | |

710

OVERALL RATING: BB
EST. VALUE: $15-45K

730

Patent Ratings (1-10)

BREADTH ("B")..................6
DEFENSIBILITY ("D")............8
RELEVANCE ("R")...............7

720

Claim Ratings (1-10)

| Claim No. | Ind./Dep. | Breadth ("B") | Defens.("D") | Relev.("R") |
|---|---|---|---|---|
| 1 | I | 7 | 7 | 7 |
| 2 | D | 6 | 7 | 9 |
| 3 | D | 5 | 8 | 7 |
| 4 | D | 5 | 8 | 5 |
| 5 | D | 3 | 9 | 9 |
| 6 | I | 5 | 8 | 5 |
| 7 | D | 4 | 8 | 7 |
| 8 | D | 3 | 9 | 9 |
| 9 | I | 6 | 8 | 6 |

740  750  755  770

Expected Maintenance Rate:

> 4 Years    85%
> 8 Years    68%
> 12 Years   50%

760

Estimated Value:

Top 10%     $45K
Median      $30K
Bottom 10%  $15K

METHOD AND SYSTEM FOR RATING PATENTS AND OTHER INTANGIBLE ASSETS

RELATED APPLICATIONS

This application is a continuation of U.S. patent application Ser. No. 10/425,554, entitled "METHOD AND SYSTEM FOR RATING PATENTS AND OTHER INTANGIBLE ASSETS" and filed Apr. 29, 2003, now U.S. Pat. No. 7,962,511, which claims priority under 35 USC §120 to and is a continuation of U.S. Ser. No. 09/661,765, filed Sep. 14, 2000, now U.S. Pat. No. 6,556,992, which claims the benefit under 35 USC §119(e) of U.S. provisional patent application Ser. No. 60/154,066, filed Sep. 14, 1999. The contents of all the foregoing patent and applications are incorporated herein by reference in their entirety.

BACKGROUND OF THE INVENTION

1. Field of the Invention

The present invention relates to the field of asset valuation and, in particular, to the field of valuing or rating patents and other intellectual property assets.

2. Description of the Related Art

Patents play an important role in our economy in encouraging private investment in the development of new technologies that improve productivity and quality of life for everyone. Each year more than a quarter-million patent applications are filed in the United States Patent and Trademark Office ("PTO") resulting annually in the issuance of over a hundred fifty-thousand patents. Patent owners and applicants pay combined annual fees and costs of nearly a billion dollars (about $6,700 per issued patent) to the PTO to prosecute and maintain their patents and applications. This does not include the additional fees and costs expended for related professional services, such as attorneys fees and drafting charges.

In addition, each year thousands of patent infringement suits are brought in the federal courts seeking to enforce patent rights. In the 12 months ended Jun. 30, 1992, U.S. federal district courts heard a total of 1407 such patent cases through trial. See, V. Savikas, "Survey Lets Judges Render Some Opinions About the Patent Bar," Nat'l L. J., Jan. 18, 1993, at 57. A recent survey conducted by the American Intellectual Property Law Associations ("AIPLA") reported that the median cost of patent litigation for each side through trial was about $650,000. AIPLA., "Report of Economic Survey" (1991). Other more recent estimates place the cost of patent enforcement litigation somewhere in the range of about $1 million per side through trial. Thus, the aggregate annual cost for obtaining, maintaining and enforcing patents in the United States is easily in the multiple billions not dollars. Similar costs are incurred by patentees in various other foreign countries where patents may be obtained and enforced.

Because of the great importance of patents in the both the U.S. and global economies there has been continued interest in quantifying the intrinsic value of patents and their contribution to economic prosperity of the individuals or companies that hold and/or control them. Such information can be useful for a variety of purposes. For example, patent holders themselves may be interested in using such information to help guide future decision-making or for purposes of tax treatment, transfer pricing or settlement of patent license disputes. Financial advisors and investors may seek to use such information for purposes of comparative value analysis and/or to construct measures of the "fundamental value" of publicly traded companies for purposes of evaluating possible strategic acquisitions or as a guide to investment. Economists may seek to use patent valuations for purposes of economic forecasting and planning. Insurance carriers may use such valuations to set insurance policy premiums and the like for insuring intangible assets. See, e.g., U.S. Pat. No. 6,018,714, incorporated herein by reference.

However, accurate valuing of patents and other intangible intellectual property assets is a highly difficult task and requires an understanding of a broad range of legal, technical and accounting disciplines. Intellectual property assets are rarely traded in open financial markets or sold at auction. They are intangible assets that secure unique benefits to the individuals or companies that hold them and/or exploit the underlying products or technology embodying the intellectual property. In the case of patent assets, for example, this unique value may manifest itself in higher profit margins for patented products, increased market power and/or enhanced image or reputation in the industry and/or among consumers or investors. These and other characteristics of intellectual property assets make such assets extremely difficult to value.

Intellectual property valuation specialists have traditionally employed three main approaches for valuing patents and other intangible intellectual property assets. These are: (1) the cost-basis approach; (2) the market approach; and (3) the income approach. See, generally, Smith & Par, *Valuation of Intellectual Property and Intangible Assets*, $2^{nd}$ Ed. 1989. Each of these traditional accounting-based approaches produces a different measure or estimate of the intrinsic value of a particular intellectual property asset in question. The choice of which approach is appropriate to use in a given circumstance for a given asset is typically determined by a professional accountant or valuation specialist, taking into consideration a variety of underlying assumptions, type of intellectual property asset(s) involved, and how such asset(s) are to be employed or exploited. Each of these approaches and the limitations associated therewith are briefly discussed below.

Cost Basis Approach

The first and simplest approach is the so-called cost-basis approach. This approach is often used for tax appraisal purposes or for simple "book value" calculations of a company's net assets. Underlying this valuation method is the basic assumption that intellectual property assets, on average, have a value roughly equal to their cost-basis. The supporting rationale is that individuals and companies invest in intellectual property asset(s) only when the anticipated economic benefits of the rights to be secured by the intellectual property asset(s) exceed the anticipated costs required to obtain the asset(s), taking into account appropriate risk factors, anticipated rates of return, etc. In theory, a rational economic decision-maker would not invest in a patent or other intellectual property asset if he or she did not believe that it would produce expected economic benefits (tangible or otherwise) at least equal to its anticipated cost-basis.

There are several drawbacks or limitations associated with the cost-basis valuation approach which limit its general applicability. One significant drawback is that the approach assumes a rational economic decision-maker. While such assumption might be statistically valid on a macro scale where many individual decisions and decision-makers are implicated (e.g., valuing all patents or a large subset of all patents), it is not necessarily a valid assumption when conducting valuation analysis on a micro scale (e.g., valuing a single patent or a portfolio of patents). It is one thing to assume that, on average, individual investment decisions and decision-makers are rational and economically motivated. It is a wholly different thing to assume that "each" investment decision or decision-maker is rational and economically motivated.

For a variety of reasons certain individuals or companies may invest uneconomically in patents or other intellectual property assets—for example, to achieve personal recognition or to superficially "dress up" balance sheets to attract potential investors or buyers. A variety of individual psychological factors may also influence investment decisions producing sometimes irrational or non-economical decisions. For example, the so-called "lottery effect" may encourage some individuals or companies to over-invest in highly speculative technologies that have the seductive allure of potentially huge economic rewards, but very little if any probability of success. Yet others may invest uneconomically in patents and/or other intellectual property assets because of fundamental misunderstandings or misinformation concerning the role of intellectual property and how it can be realistically and effectively exploited.

But even assuming a well-informed, rational, economically-motivated decision-maker, the cost-basis approach is still susceptible to inherent uncertainties in the decision-maker's informed and honest projections of the anticipated economic benefits to be gained by a patent or other intellectual property asset. These benefits are often unknown even to the patentee until well after the patent has been applied for and often not until long after the patent has issued. Many new inventions that may look promising on paper or in the laboratory turn out to be economically or commercially infeasible for a variety of reasons and, as a result, patents covering such inventions may have little if any ultimate intrinsic economic value. Other inventions that may seem only marginal at the time the patent is applied for may turn out to be extremely valuable and, if a broad scope of protection is obtained, may return economic benefits far in excess of the cost-basis of the patent. The cost basis approach thus fails to differentiate between these two extremes because (all other things being equal) the cost basis is the same for securing a patent on the worthless invention as it is for securing a patent on the valuable invention.

The cost-basis approach also does not account for the possibility of evolution of products and technology over time and changing business and economic conditions. Rather, the cost-basis approach implicitly assumes a static business and economic environment, providing a fixed value based on actual costs expended at the time of the initial investment without taking into account how the value of that investment might change over time. As a result of these and other short-comings, the cost-basis approach has only limited utility as a method for accurately estimating the intrinsic economic value of patents or other intellectual property assets in real-world business environments.

Market Approach

The second traditional valuation approach—the market approach—seeks to provide real-world indications of value by studying transactions of similar assets occurring in free and open markets. In theory, the market approach can provide very accurate measures or estimates of intrinsic value. In practice, however, there are very few open financial markets that support active trading of intellectual property and other similar intangible assets. Most intellectual property assets are bought or sold in private transactions involving sales of entire businesses or portions of businesses. And even if the financial particulars of each such transaction were readily available, it would be difficult, if not impossible, to disaggregate the intellectual property assets involved in the transaction from the other assets and allocate an appropriate value to them.

As a result of these and other practical difficulties, there is presently very little direct real-world data on which to base market comparisons of intellectual property and other similar intangible assets. Nevertheless, several interesting studies have been reported which attempt indirectly to extract market-based valuations of patents and other intellectual property assets by studying the stock prices of various publicly traded companies that hold such assets. See, Hall, "Innovation and Market Value," Working Paper No. 6984 NBER (1999); and Cockburn et al., "Industry Effects and Appropriability Measures in the Stock Market's Valuation of R&D and Patents," Working Paper No. 2465 NBER (1987).

While interesting in their approach, the usefulness of the methodologies taught by these studies in terms of valuing individual patent and other intellectual property assets is limited. Such indirect market-based valuation approaches mostly attempt to establish only a generalized correlation between stock prices of publicly traded companies and the aggregate number of intellectual property assets held or controlled by those companies. Because individual stock prices are generally reflective of the overall aggregated assets of a company and its future earnings potential, such indirect market-valuation approaches do not lend themselves readily to valuing individual identified intellectual property assets. Moreover, intellectual property and other intangible assets owned by publicly traded companies comprise only a fraction of the total population of potential intellectual property assets that may be of interest.

A computer-automated variation of the traditional market approach specifically adapted for rating patent portfolios is described in U.S. Pat. No. 5,999,907. In this case, a first database is provided containing information describing selected characteristics of a portfolio of patents to be acquired. A second database is provided containing empirical data describing selected characteristics of representative patent portfolios having known market values. Estimated valuations are obtained by comparing information in the first data base to information in the second database to determine which known patent portfolio the portfolio to be acquired matches the closest. The value of the closest matching known portfolio is then used as a rough approximation of the value of the portfolio to be acquired.

While such approach provides an innovative variation of the market-based valuation technique described above, it is again ultimately limited by the need to acquire relevant market data of known patent portfolios. As noted above, such information is very difficult to obtain. Unless a large amount of such data could be collected and analyzed, the effectiveness and accuracy of such an approach would be very limited. Even if a large amount of such data could be collected and stored in a suitable computer-accessible database, the process of individually retrieving and comparing relevant characteristics of each representative portfolio in the database would be undesirably time consuming, even using a high-speed computer. Moreover, the statistical accuracy of the resulting approximated valuations would be undetermined.

Income Approach

The third and perhaps most commonly used accounting-based approach for valuing intellectual property and other intangible assets is the so-called income approach. This approach can provide accurate and credible valuations of intellectual property assets in certain situations where an isolated stream (or streams) of economic benefit can be identified and attributed to an intellectual property asset in question. The income approach values an intellectual property asset by capitalizing or discounting to present value all future projected revenue streams likely to be derived from its continued exploitation. For example, if a patent asset is licensed under an agreement that provides for a predictable income stream over a certain period of time into the future, then the intrinsic value of the patent may be accurately calculated by taking the net discounted present value of the residual income stream (less any scheduled maintenance costs). Similarly, if the patentee is directly exploiting the patent itself, the intrinsic value of the patent may be calculated by taking the net discounted value of the incremental profit stream (assuming it can be identified) attributable to the patent over the remaining life of the patent or the economic life of the patented technology.

In theory, the income valuation approach can produce very accurate estimates of intrinsic value for certain intellectual property and other intangible assets. In practice, however, it is often difficult to identify with certainty and precision an isolated income stream attributable to a particular intellectual property asset in question, let alone an income stream that is predictable over time. In addition, many intellectual property assets, particularly newly issued patents, are not licensed or exploited at all and, therefore, there are no identifiable income streams upon which to base a valuation.

In such circumstances many asset valuation specialists attempt to project possible or hypothetical future revenue streams or economic benefits based on available data of other similar companies in the industry and/or other license agreements for similar intellectual property assets in the same general technical field. Some patent valuation experts have even established extensive data-bases of patent licenses and have attempted to establish a schedule of "standard" or baseline royalty rates or royalty ranges for patent licenses in various industries for purposes of forecasting possible future revenue streams. While such information can be very helpful, without an actual demonstrated income stream or other proven economic benefit, the income-based valuation approach loses credibility and can become more speculation than valuation.

Each of the above valuation approaches has its characteristic strengths and weaknesses. Of course, no single valuation method can provide absolute certainty of the true intrinsic value of an asset. This is especially true when valuing patents and other intangible intellectual property assets. Nevertheless, a need exists for a comparative valuation technique that overcomes the aforementioned problems and limitations and which does not require collecting comparative market data of existing patent portfolios or calculating future hypothetical income streams or royalty rates. There is a further need for an intellectual property valuation method that produces statistically accurate valuations, ratings or rankings according to a determined statistical accuracy.

SUMMARY OF THE INVENTION

The present invention compliments and improves upon traditional valuation approaches by providing an objective, statistical-based rating method and system for independently assessing the relative breadth ("B"), defensibility ("D") and commercial relevance ("R") of individual patent assets and other intangible intellectual property assets according to a determined statistical accuracy. Thus, the invention can be used to provide new and valuable information that can be used by patent valuation experts, investment advisors, economists and others to help guide future patent investment decisions, licensing programs, patent appraisals, tax valuations, transfer pricing, economic forecasting and planning, and even mediation and/or settlement of patent litigation lawsuits.

In one embodiment the invention provides a statistically-based patent rating method and system whereby relative ratings or rankings are generated using a database of patent information by identifying and comparing various characteristics of each individual patent to a statistically determined distribution of the same characteristics within a given patent population. For example, a first population of patents having a known relatively high intrinsic value or quality (e.g. successfully litigated patents) is compared to a second population of patents having a known relatively low intrinsic value or quality (e.g. unsuccessfully litigated patents). Based on a statistical comparison of the two populations, certain characteristics are identified as being more prevalent or more pronounced in one population group or the other to a statistically significant degree. Multiple such statistical comparisons are used to construct sand optimize a computer model or computer algorithm that can then be used to accurately predict and/or provide statistically-accurate probabilities of a desired value or quality being present or a future event occurring, given the identified characteristics of an individual patent or group of patents.

The algorithm may comprise a simple scoring and weighting system which assigns scores and relative weightings to individual identified characteristics of a patent or group of patents determined to have statistical significance. For example, positive scores would generally be applied to those patent characteristics having desirable influence and negative scores would apply to those patent characteristics having undesirable influence on the particular quality or event of interest. A high-speed computer is then used to repeatedly test the algorithm against one or more known patent populations (e.g., patents declared to be valid/invalid or infringed/non-infringed). During and/or following each such test the algorithm is refined by adjusting the scorings and/or weightings until the predictive accuracy of the algorithm is optimized. Once the algorithm is suitably optimized, selected metrics for an individual indentified patent or group of patents to be rated are input into the algorithm and the algorithm is operated to calculate an estimated rating or mathematical score for that patent or group of patents. Individual results could be reported as statistical probabilities of a desired quality being present, or a future event occurring (patent being litigated, abandoned, reissued, etc.) over a specified period in the future. Results could also be provided as arbitrary raw scores representing the sum of an individual patent's weighted scores, which raw scores can be further ranked and reported on a percentile basis within a given patent population and/or upon any other comparative or non-comparative basis as desired.

The first and second patent populations selected for analysis are preferably roughly the same size and may comprise essentially any two groups of patents (or identifiable subsets of a single group of patents) having different actual or assumed intrinsic values or other qualities of interest. For example, the first population may consist of a random sample of 500-1000 patents that have been successfully litigated (found valid and infringed) and the second population may consist of a random sample of 500-1000 patents that have been unsuccessfully litigated (found either invalid or not infringed). Alternatively, the first population may consist of a random sample of patents that have been litigated and found valid regardless of whether infringement is also found, and the second population may consist of a random sample of patents that have been found invalid. Likewise, the first population may consist of a random sample of patents that have been litigated and found infringed regardless of the validity finding and the second population may consist of a random sample of patents that have been found not infringed.

The selection of which study population(s) to use depends upon the focus of the statistical inquiry and the desired quality (e.g., claim scope, validity, enforceability, etc.) of the patent asset desired to be elicited. For example, if validity is the quality of interest, then the first and second patent populations may preferably be selected such that one population is known or predicted to have a higher incidence of invalid patents than the other population. This information may be readily gathered from published patent decisions of the Federal Circuit and/or the various federal district courts. Thus, the first population may consist of a random sample of patents declared invalid by a federal court and the second population may consist of a random sample of patents from the general patent population, which are presumed to be valid. Alternatively, the second population may consist of a random sample of patents declared "not invalid" by a federal court following a validity challenge.

The approach is not limited, however, to analyzing litigated patents. For example, fruitful comparisons may also be made between litigated patents (presumably the most valuable patents) and non-litigated patents; or between high-royalty-bearing patents and low-royalty-bearing patents; or between high-cost-basis patents and low-cost-basis patents; or between published patent applications and issued patents. The number and variety of definable patent populations having different desired qualities or characteristics capable of fruitful comparison in accordance with the invention herein is virtually unlimited. While not specifically discussed herein, those skilled in the art will also recognize that a similar approach may also be used for valuing and/or rating other intellectual property or intangible assets such as trademarks, copyrights, domain names, web sites, and the like.

In accordance with another embodiment the invention provides a method for rating or ranking patents. In accordance with the method, a first population of patents is selected having a first quality or characteristic and a second population of patents is selected having a second quality or characteristic that is different from the first quality or characteristic. Statistical analysis is performed to determine or identify one or more patent metrics having either a positive or negative correlation with either said first or second quality to a statistically significant degree. A regression model is constructed using the identified patent metric(s). The regression model is iteratively adjusted to be generally predictive of either the first or second quality being present in a given patent. The regression model is used to automatically rate or rank patents by positively weighting or scoring patents having the positively correlated patent metrics and negatively weighting or scoring patents having the negatively correlated patent metrics ("positive" and "negative" being used here in the relative sense only). If desired, the method may be used to generate a patent rating report including basic information identifying a particular reported patent or patents of interest and one or more ratings or rankings determined in accordance with the method described above:

In accordance with another embodiment the invention provides a statistical method for scoring or rating selected qualities of individual patents and for generating a rating report specific to each individual patent rated. The method begins by providing a first database of selected patent information identifying and/or quantifying certain selected characteristics of individual patents from a first population of patents having a selected patent quality of interest. A second database (or identified subset of the first database) of selected patent information is also provided identifying and/or quantifying certain selected characteristics of individual patents from a second population of patents generally lacking or having reduced incidence of the selected patent quality of interest. Statistical analysis is performed to identify one or more characteristics that are statistically more prevalent or more pronounced in either the first or second patent population to a statistically significant degree. Based on this information and the identified characteristics, individual patents may be scored or rated by positively weighting those having the same or similar characteristics and negatively weighting those lacking the same or similar characteristics. If desired, the method may be used to generate a patent rating report including basic information identifying a particular reported patent or patents of interest and one or more ratings or rankings determined in accordance with the method described above.

In accordance with another embodiment the invention provides a method and automated system for rating or ranking patents or other intangible assets. In accordance with the method a first population of patents is selected having a first quality or characteristic and a second population of patents is selected having a second quality or characteristic that is different from or believed to be different from the first quality or characteristic. A computer accessible database is provided and is programmed to contain selected patent metrics representative of or describing particular corresponding characteristics observed for each patent in the first and second patent populations. A computer regression model is constructed and adjusted based on the selected patent metrics. The regression model is operable to input the selected patent metrics for each patent in the first and second patent populations and to output a corresponding rating or ranking that is generally predictive of the first and/or second quality being present in each patent in the first and second patent populations. The regression model may then be used to rate or rank one or more patents in a third patent population by inputting into the regression model selected patent metrics representative of or describing corresponding characteristics of one or more patents in the third population.

In accordance with another embodiment the invention provides a high-speed method for automatically scoring or rating a sequential series of newly issued patents as periodically published by the PTO and for determining and storing certain rating or scoring information specific to each patent. According to the method, a substantial full-text copy of each patent in the sequential series is obtained in a computer text file format or similar computer-accessible format. A computer program is caused to automatically access and read each computer text file and to extract therefrom certain selected patent metrics representative of or describing particular observed characteristics or metrics of each patent in the sequential series. The extracted patent metrics are input into a computer algorithm. The algorithm is selected and adjusted to produce a corresponding rating output or mathematical score that is generally predictive of a particular patent quality of interest and/or the probability of a particular future event occurring. Preferably, for each patent in the sequential series the rating output or mathematical score is stored in a computer accessible storage device in association with other selected information identifying each rated patent such that the corresponding rating or score may be readily retrieved for each patent in the sequential series.

In accordance with another embodiment the invention provides a method for valuing individual selected patents. A patent value distribution curve and/or data representative thereof is provided. The shape of the curve generally represents an estimated distribution of patent value according to percentile rankings within a predetermined patent population. The area under the curve is generally proportional to the total approximated value of all patents in the predetermined patent population. Individual selected patents from the population are ranked in accordance with selected patent metrics to determine an overall patent quality rating and ranking for each individual selected patent. The patent value distribution curve is then used to determine a corresponding estimated value for an individual selected patent in accordance with its overall patent quality ranking. If desired, the method may be used to generate a patent valuation report including basic information identifying a particular reported patent or patents of interest and one or more valuations determined in accordance with the method described above.

In accordance with another embodiment, the invention provides an automated method for scoring or rating patents in accordance with user-defined patent metrics and/or patent populations. The automated method is initiated by a user selecting a patent, or group of patents, to be rated. A full-text computer accessible file of the patent to be rated is retrieved from a central database, such as that currently maintained by the U.S. Patent & Trademark Office at www.uspto.gov. A computer algorithm evaluates the full-text file of the patent to be rated and extracts certain selected patent metric(s), which may be predefined, user-defined, or both. Based on the selected patent metric(s), the algorithm computes a rating number or probability (e.g., between 0 and 1) corresponding to the likely presence or absence of one or more user-defined qualities of interest in the patent to be rated and/or the probability of one or more possible future events occurring relative to the patent. If desired, the rating number or probability can be further ranked against other similar ratings for patents within a selected patent population, which may be predetermined, user-defined, or both. Thus, the method in accordance with the preferred embodiment of the invention is capable of producing multiple independent ratings and/or rankings for a desired patent to be rated, each tailored to a different user-defined inquiry, such as likelihood of the patent being litigated in the future, being held invalid, likelihood of successful infringement litigation, predicted life span of the patent, relative value of the patent, etc.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments and obvious variations thereof are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the overall general nature of the invention and its features and advantages, certain preferred embodiments and examples will now be described in detail having reference to the figures that follow, of which:

FIG. 11 is one possible preferred embodiment of a patent rating report generated in accordance with the method and system of FIG. 1 and having features and advantages of the present invention.

DETAILED DESCRIPTION OF THE PREFERRED EMBODIMENT

Figure 1:
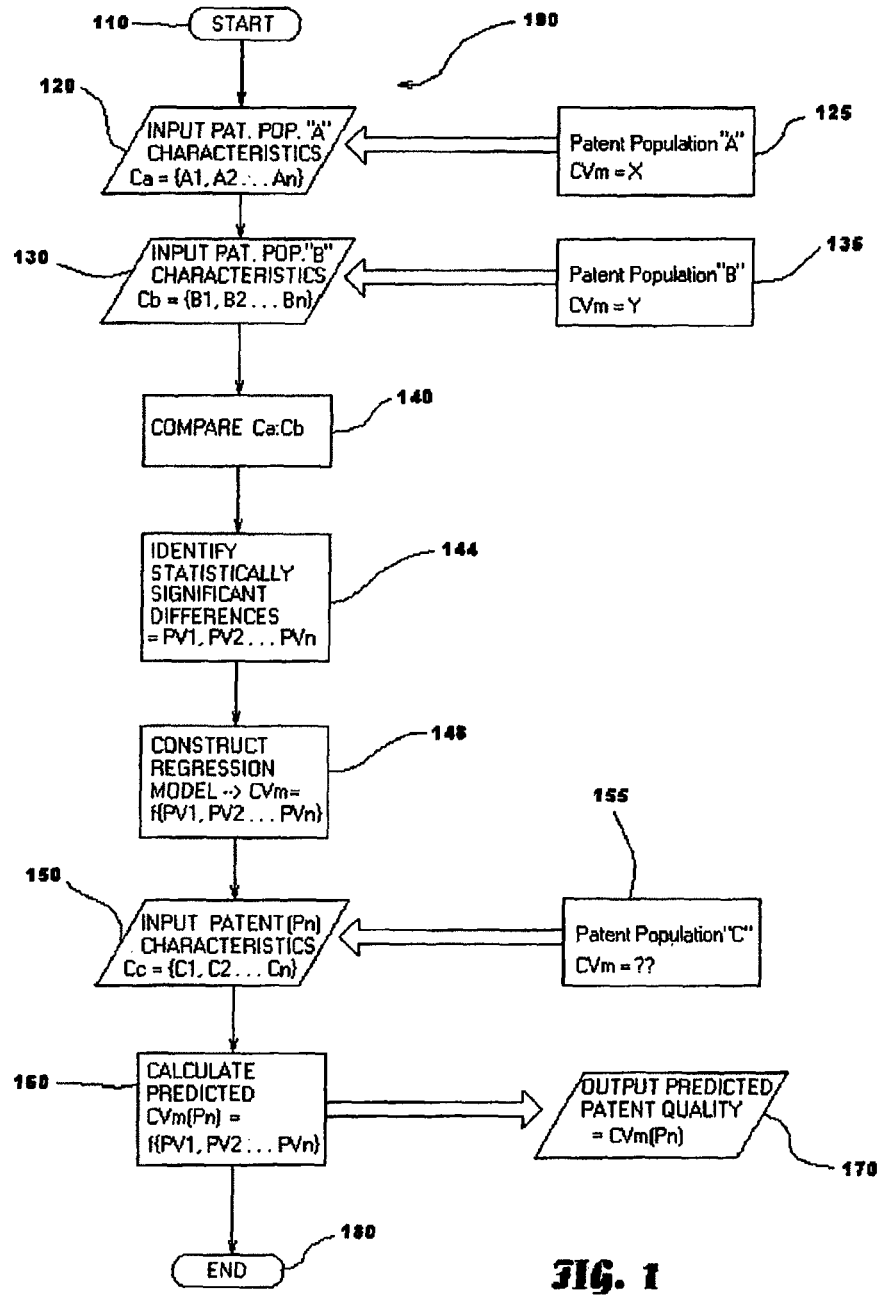
FIG. 1 is a simplified schematic system block-diagram illustrating one possible embodiment of a patent rating method and system having features and advantages in accordance with the present invention.

The utility of the present invention begins with the fundamental observation that not all intellectual property assets are created equal. In the case of patent assets, for example, two patents even in the same industry and relating to the same subject matter can command drastically different royalty rates in a free market, depending upon a variety of factors. These factors may include, for example: (1) the premium or incremental cost consumers are willing to pay for products or services embodying the patented technology; (2) the economic life of the patented technology and/or products; (3) the cost and availability of competing substitute technology and/or products; and (4) the quality of the underlying patent asset.

The quality of a patent in terms of the breadth or scope of rights secured, its defensibility against validity challenges and its commercial relevance can have particularly dramatic impact on its value. Obviously, a patent that has a very narrow scope of protection or that is indefensible against a validity challenge will have much less value than a patent that has a broad scope of protection and strong defensibility. A skilled patent lawyer can examine the claims and specification of a patent, its prosecution history and cited prior art and, based on a detailed legal analysis, render a subjective opinion as to the likely scope and defensibility of the patent. However, such legal work is time-intensive and expensive. Thus, it may not be economically feasible to consult with a patent lawyer in every situation where such information may be desired.

The patent rating method and system of the present invention is not proposed to replace conventional legal analysis or traditional valuation methods, but to complement and support the overall evaluative process. In one embodiment, the present invention provides an objective, statistical-based rating method and system for substantially independently assessing the relative breadth ("B"), defensibility ("D") and commercial relevance ("R") of individual patent assets and other intangible intellectual property assets. Thus, the invention can provide new and valuable information which can be used by patent valuation experts, investment advisors, economists and others to help guide future patent investment decisions, licensing programs, patent appraisals, tax valuations, transfer pricing, economic forecasting and planning, and even mediation and/or settlement of patent litigation lawsuits. Such information may include, for example and without limitation: statistically calculated probabilities of particular desired or undesired qualities being present; statistical probabilities of certain future events occurring relative to the asset in question; ratings or rankings of individual patents or patent portfolios; ratings or rankings of patent portfolios held by public corporations; ratings or rankings of patent portfolios held by pre-IPO companies; ratings or rankings of individual named inventors; and ratings or rankings of professional service firms, law firms and the like who prepare, prosecute and enforce patents or other intellectual property assets.

In its simplest form the present invention provides a statistical patent rating method and system for rating or ranking patents based on certain selected patent characteristics or "patent metrics." Such patent metrics may include any number of quantifiable parameters that directly or indirectly measure or report a quality or characteristic of a patent. Direct patent metrics measure or report those characteristics of a patent that are revealed by the patent itself, including its basic disclosure, drawings and claims, as well as the PTO record or file history relating to the patent. Specific patent metrics may include, for example and without limitation, the number of claims, number of words per claim, number of different words per claim, word density (e.g., different-words/total-words), length of patent specification, number of drawings or figures, number of cited prior art references, age of cited prior art references, number of subsequent citations received, subject matter classification and sub-classification, origin of the patent (foreign vs. domestic), payment of maintenance fees, prosecuting attorney or firm, patent examiner, examination art group, length of pendency in the PTO, claim type (i.e. method, apparatus, system), etc.

Indirect patent metrics measure or report a quality or characteristic of a patent that, while perhaps not directly revealed by the patent itself or the PTO records relating to the patent, can be determined or derived from such information (and/or other information sources) using a variety of algorithms or statistical methods including, but not limited to, the methods disclosed herein. Examples of indirect patent metrics include reported patent litigation results, published case opinions, patent licenses, marking of patented products, and the like. Indirect patent metrics may also include derived measures or measurement components such as frequency or infrequency of certain word usage relative to the general patent population or relative to a defined sub-population of patents in the same general field.

For example, each word and/or word phrase in a patent claim (and/or patent specification) could be assigned a point value according to its frequency of use in a randomly selected population of similar patents in the same general field. Statistically common words or word phrases such as simple articles, pronouns and the like could receive relatively low point values. Uncommon words or word phrases could receive relatively high point values. The total point score for each claim could then be taken as an indication of its relative breadth or narrowness based on the total number and statistical prevalence of each of the words contained in the claim. Optionally, different amounts of points can be accorded to claim words or word phrases based on whether or not they also appear in the patent specification. Multiple claims and/or patents could also be combined into a single analysis, if desired.

In accordance with one preferred embodiment of the invention relative ratings or rankings are generated using a database of selected patent information by identifying and comparing various relevant characteristics or metrics of individual patents contained in the database. In one example, a first population of patents having a known or assumed relatively high intrinsic value (e.g. successfully litigated patents) are compared to a second population of patents having a known or assumed relatively low intrinsic value (e.g. unsuccessfully litigated patents). Based on the comparison, certain characteristics are identified as statistically more prevalent or more pronounced in one population group or the other to a significant degree.

These statistical comparisons are then used to construct and optimize a computer model or computer algorithm comprising a series of operative rules and/or mathematical equations. The algorithm is used to predict and/or provide statistically determined probabilities of a desired value or quality being present and/or of a future event occurring, given the identified characteristics of an individual identified patent or group of patents. The algorithm may comprise a simple scoring and weighting system which assigns scores and relative weightings to individual identified characteristics of a patent or group of patents determined (or assumed) to have statistical significance. For example, positive scores could generally be applied to those patent characteristics determined or believed to have desirable influence and negative scores could be applied to those patent characteristics determined or assumed to have undesirable influence on the particular quality or event of interest.

Once the basic algorithm is constructed, a high-speed computer is preferably used to repeatedly test the algorithm against one or more known patent populations (e.g. patents declared to be valid/invalid or infringed/non-infringed). During and/or following each such test the algorithm is refined (preferably automatically) by iteratively adjusting the scorings and/or weightings assigned until the predictive accuracy of the algorithm is optimized. Adjustments can be made automatically in an orderly convergence progression, and/or they can by made randomly or semi-randomly. The latter method is particularly preferred where there are any non-linearities in the equations or rules governing the algorithm. Algorithm results are preferably reported as statistical probabilities of a desired quality being present, or a future event occurring (e.g., patent being litigated, abandoned, reissued, etc.) during a specified period in the future. Algorithm results could also be provided as arbitrary raw scores representing the sum of an individual patent's weighted scores, which raw scores can be further ranked and reported on a percentile basis or other similar basis as desired. Preferably, the statistical accuracy of the algorithm is tracked and reported over time and periodic refinements are made as more and more data is collected and analyzed.

System Architecture

FIG. 1 is a simplified block diagram of one possible embodiment of a patent rating method and automated system 100 having features and advantages in accordance with the present invention. The system is initiated at the START block 110. At block 120 certain characteristics $C_a$ of Patent Population "A" are inputted from a database 125 in the form:

$$C_a = \{A_1, A_2 \ldots A_n\}$$

where: $C_a$=set of selected characteristics of Pat. Pop. "A"
$A_n$=an individual selected characteristic of Pat. Pop. "A"

At block 130 characteristics $C_b$ of Patent Population "B" are inputted from a database 135 in the form:

$$C_b = \{B_1, B_2 \ldots B_n\}$$

where: $C_b$=set of selected characteristics of Pat. Pop. "B"
$B_n$=an individual selected characteristic of Pat. Pop. "B"

Preferably, Patent Population "A" and Patent Population "B" are selected to have different known or assumed intrinsic values and/or qualities such that a fruitful comparison may be made. For example, Population "A" may comprise a random or semi-random (e.g., representative) sample of successfully litigated patents and/or individual patent claims. Population "B" may comprise a random or semi-random sample of unsuccessfully litigated patents and/or individual patent claims. In that case, Population "A" patents/claims may be assumed to have higher intrinsic value than Population "B" patents/claims. Alternatively, and regardless of whatever assumed or intrinsic economic value the patents may have, Population "A" patents may be described as having the quality of being successfully litigated (infringement or validity), whilst Population "B" patents may be described as having the quality of being unsuccessfully litigated (infringement or validity). Thus, by examining and comparing the characteristics of litigated patents/claims that fall into either population "A" or "B", one can make certain statistical conclusions and predictions about other patents that may or may not have been litigated. Such probabilistic analysis can also be easily extended to accurately calculate the odds, for example, of prevailing on a particular patent infringement claim or defense in a particular litigation proceeding (e.g., preliminary injunction motion, summary judgement motion, jury trial, bench trial, appeal, etc.). Such information would be of tremendous value to patent litigants, for example.

Of course, the study populations are not limited to litigated patents/claims. For example, one study population may comprise a random or semi-random sample of patents selected from the general patent population and having a representative "average" value or quality. The other study population may comprise, for example and without limitation, a random or semi-random sample of patents selected from a sub-population consisting of all patents for which $1^{st}$, $2^{nd}$ or $3^{rd}$ maintenance fees have been paid; or all patents that have been licensed for more than a predetermined royalty rate; or all patents that have been successfully reissued/reexamined; or all patents that have related counterpart foreign patents; or all patents that have been subsequently cited by other patents at least X times; etc. The number and variety of possible ways to define study populations of interest in accordance with the invention are virtually limitless.

Next, at block 140 a comparison is made between the selected characteristics $C_a$ of Patent Population "A" and the same selected characteristics $C_b$ of Patent Population "B". Based on the comparison, certain characteristics are identified at block 144 as being statistically more prevalent or more pronounced in one population or the other to a significant degree. This comparison can be performed and the statistical significance of observed differences determined by applying known statistical techniques. Thus, certain statistically relevant characteristics of each study population can be readily identified and described mathematically and/or probabilistically.

At block 148 a multiple regression model is constructed using the identified statistically relevant characteristics determined at block 144. Multiple regression modeling is a well-known statistical technique for examining the relationship between two or more predictor variables (PVs) and a criterion variable (CV). In the case of the present invention the predictor variables (or independent variables) describe or quantify the selected relevant characteristics of a particular patent population, e.g., class/sub-class, number of independent claims, number of patent citations, length of specification, etc. Criterion variables (or dependent variables) measure a selected quality of a particular patent population, such as likelihood of successful litigation (either validity or infringement). Multiple regression modeling allows the criterion variable to be studied as a function of the predictor variables in order to determine a relationship between selected variables. This data, in turn, can be used to predict the presence or absence of the selected quality in other patents. The regression model has the form:

$$CV_m = f\{PV_1, PV_2 \ldots PV_n\}$$

where: $CV_m$=criterion variable (e.g., quality desired to be predicted)
$PV_n$=predictor variable (e.g., statistically relevant characteristic)

Once the regression model is completed it can be applied at block 150 to predict the presence or absence of the selected quality in other patents selected from Patent Population "C", for example, which may be the same as or different from Populations "A" or "B." Characteristics $C_c$ of each individual patent $P_n$ to be analyzed are inputted at block 150 from a database 155 in the form:

$$C_c = \{C_1, C_2 \ldots C_n\}$$

where: $C_c$=set of selected characteristics of a patent $P_n$
$C_n$=an individual selected characteristic of patent $P_n$ The relevant characteristics $PV_n$ of patent $P_n$ are identified and plugged into the regression model at block 160. The resulting predicted value or score $CV_m$, representing the quality of interest for patent $P_n$, is then outputted to a data output file 178, printer or other output device, as desired. The system terminates at STOP block 180.

Statistical Methodology

Many different methods of statistical analysis may be suitably employed to practice the present invention. The preferred methodology is a multiple regression technique performed, for example, by a high-speed computer. As noted above, multiple regression modeling is a statistical technique for examining the relationship between two or more predictor variables (PVs) and a criterion variable (CV). In the case of the present invention the predictor variables (or independent variables) describe or quantify certain observable characteristics of a particular patent population, e.g., number of independent claims, length of specification, etc. Criterion variables (or dependent variables) measure a selected quality of interest of a particular patent population, such as likelihood of successful litigation, validity or infringement. Multiple regression modeling allows the criterion variable to be studied as a function of the predictor variables in order to determine a relationship between selected variables. This data, in turn, can be used to predict the presence or absence of the selected quality in other patents.

For example, if one were interested in examining the relationship between the number of times the word "means" is used in a claim (the PV) and a finding of infringement in litigation (the CV), one could use the following simple linear regression model:

$$Y = a + bXi$$

Where: Y=criterion variable (likelihood of patent infringement)

Xi=predictor variable (number of times "means" appears)

a=the Y-intercept (% found infringed where Xi=0)

b=the rate of change in Y given one unit change in Xi

The coefficients a, b can be determined by iteration or other means so that the sum of squared errors is minimized in accordance with the well-known ordinary least squares (OLS) technique. Given least squares fit, the mean of the errors will be zero.

Figure 2:
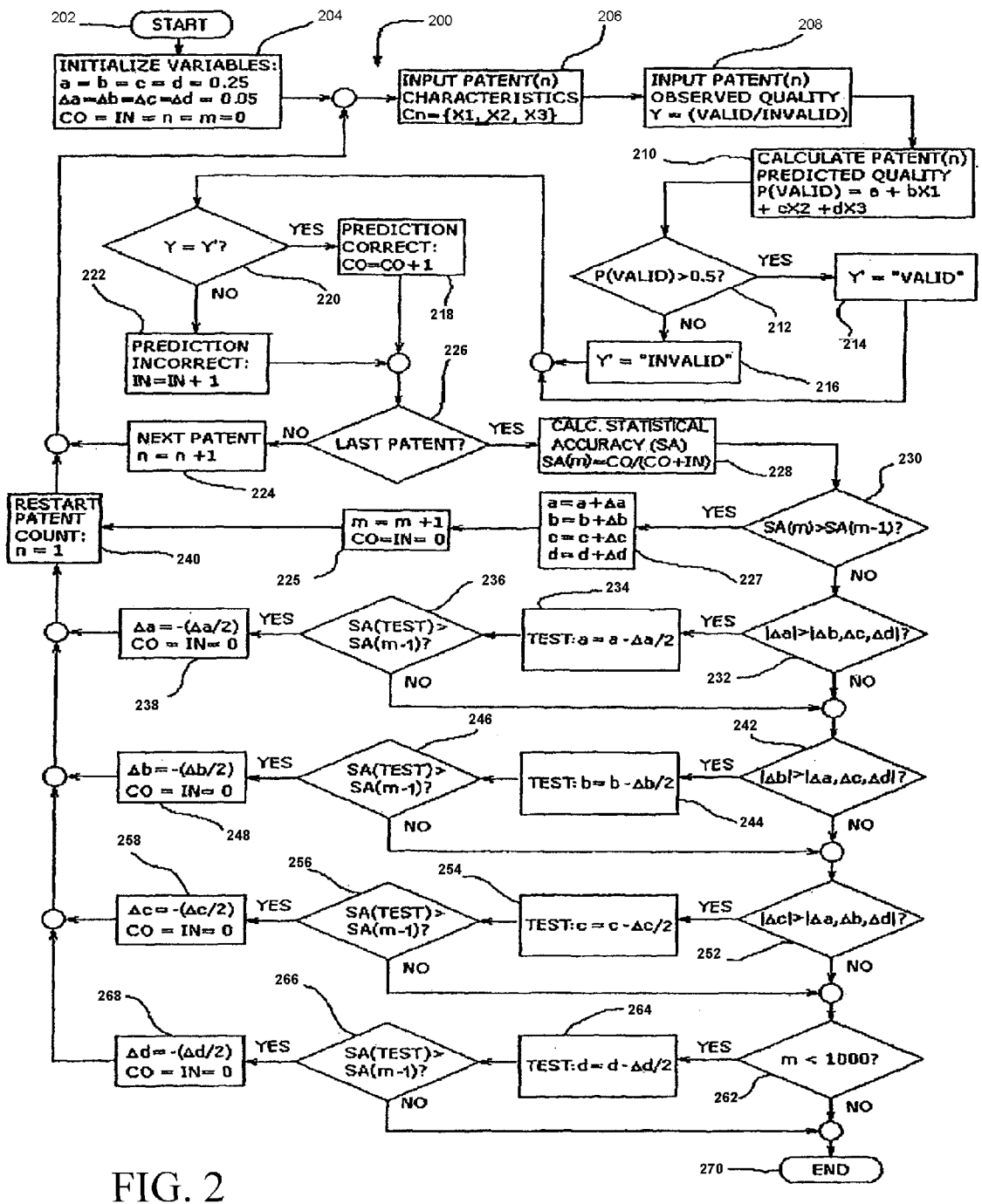
FIG. 2 is a simplified schematic flow chart of one possible multiple regression technique suitable for carrying out the rating method and system of FIG. 1.

The above example is a single-variable, linear regression model. In carrying out the present invention, those skilled in the art will readily appreciate that it may be desirable to include a number of different predictor variables (PVs) in the regression model (expressed either as linear or non-linear functions and/or rules) in order to extract useful information from available patent data. FIG. 2 is a simplified schematic flow chart 200 of one such suitable multiple regression technique that may be employed in carrying out the present invention.

The flow chart begins at the START block 202. At block 204 certain system variables are initialized. These include multi-regression coefficients a, b, c and d, incremental step changes Δa, Δb, Δc and Δd for each coefficient a, b, c and d, respectively, and various counters CO (#correct predictions), IN (# incorrect predictions), n (# patent in population) and m (loop repeat count). At step 206 the system inputs selected characteristics ($C_n = X_1, X_2, X_3$) of the next patent (n) in the study population (e.g., litigated patents). Preferably, the characteristics $X_1, X_2, X_3$ have been previously selected and determined to have a statistically significant impact on the selected patent quality desired to be measured. At step 208 the observed patent quality Y of patent n is inputted into the system. In this case, the patent quality of interest is the validity or invalidity of the patent as determined by a final judgement of a court. Alternatively, the measured patent quality could be any one or more of a number of other qualities of interest such as discussed above.

At step 210 the system calculates a predicted patent quality such as the probability that the patent in question is valid P(valid). In this case, a simple linear multi-regression model is chosen having the form:

$$P(\text{valid}) = a + bX_1 + cX_2 + dX_3$$

where: P(valid)=predicted probability of patent validity $X_1, X_2, X_3$ are various predictor variables a=Y-intercept (% found valid where $X_1, X_2, X_3 = 0$)

b,c,d=rate of change in P(valid) per unit change of $X_1, X_2, X_3$

Once the probability of validity is calculated, the system at step 212 determines an expected quality Y' based on the probability P(valid). In particular, if P(valid) is calculated to be greater than 0.5 (>50%) then the expected outcome Y' is that the patent is "VALID" as indicated by block 214. If P(valid) is calculated to be less than 0.5 (<50%) then the expected outcome Y' is that the patent is "INVALID" as indicated by block 216.

The expected patent quality or outcome Y' is then compared to the actual observed patent quality Y at step 220 and a determination is made whether Y=Y' indicating a correct prediction (block 218) or whether Y<>Y' indicating an incorrect prediction (block 222). In the case of a correct prediction the counter CO is incremented. In the event of an incorrect prediction, the counter IN is incremented. If patent(n) is not the last patent in the study population, then decision block 226 directs the system to loop back again repeating the above steps 206-226 for the next patent n=n+1 in the population and incrementing the patent counter n at block 224. If patent(n) is the last patent in the population (n=#pop) then decision block 226 directs the system to begin a statistical analysis of the regression model.

This analysis begins at block 228 wherein the statistical accuracy (SA) of the model (m) is calculated using the equation:

$$SA(m) = CO/(CO+IN)$$

where: SA(m)=statistical accuracy of regression model (m)

CO=number of correct predictions for model (m)

IN=number of incorrect predictions for model (m)

The statistical accuracy SA(m) is a simple and easily calculated measure of how much observed data was accurately accounted for (i.e. correctly predicted) by the regression model (m). This is a very basic measure of the predictive accuracy of the regression model and is described herein by way of example only. If desired, a more sophisticated approach, such as variance analysis, could also be used to accurately measure the predictive power of a given regression model (m).

Variance analysis measures the variance in the criterion variable (e.g., Y') as a function of each of the predictor variables (e.g., $X_1, X_2, X_3$). The measured variance in the criterion variable (Y') can be broken into two parts: that predicted by one or more of the selected predictor variables and that variance not predicted by the selected predictor variables. The latter is often referred to as "error variance." The total predicted variance is the amount of variance accounted for by the regression model. For instance, if the predicted variance is 0.78—this means the regression model is accounting for 78% of the possible variance. Of course, it is important and desirable to account for as much variance as possible with a given regression model. The more variance one can account for, the more confidence one has about the predictions made by the regression model.

Predicted variance can also be increased by adding more predictor variables to the regression model. But, as the number of predictor variables in the regression model increases beyond a certain point there is a risk that the predicted variance may become artificially inflated, indicating that the model is purporting to account for variance that is not actually accounted for in the population. This problem may be controlled by selecting an appropriate number of predictor variables in a given model in accordance with the number of samples in the population. Preferably, the number of predictor variables is no more than about 5-10% of the total number of samples in a given population and is most preferably less than about 1-3% of the total population. Thus, for a patent population size of 1,000, preferably the number of predictor variables is no more than about 50-100 and most preferably no more than about 10 to 30 total, or between about 15-25. Alternatively, where it is desirable to use more predictor variables in a given regression model, an adjusted predicted variance may be calculated using well-known techniques which take into account both the number of predictor variables and the sample size.

Decision block 230 compares the calculated statistical accuracy SA(m) of the current regression model (m) to the statistical accuracy SA(m−1) of the previous regression model (m−1). If the statistical accuracy SA(m) indicates improvement, then decision block 230 directs the system to coefficient adjustment block 227. This block increments or decrements one or more of the coefficients (a, b, c and d) by a predetermined amount (Δa, Δb, Δc and Δd). The adjustment amounts (+ or −) are periodically determined by the system 200 to accurately converge the regression model toward maximum statistical accuracy SA. This may be done in a variety of ways. One simple convergence technique is described below.

If decision block 230 determines that SA(m) <SA(m−1), this indicates that the current regression model (m) is a worse predictor of the desired patent quality than the previous regression model (m−1). Therefore, a different adjustment is needed to be made to the coefficients a, b, c, and/or d in order to cause the system to reconverge toward the optimal solution providing for maximum predictive accuracy. This is done by directing the system to blocks 232-268 to test the impact of various changes to each predictor variable (a, b, c, d) and to change one or more of the coefficient adjustment amounts (Δa, Δb, Δc and Δd) as necessary to reconverge on the optimal solution.

Preferably, course adjustments are made first and then finer and finer adjustments are continually made as the regression model converges on an optimal solution having maximized statistical accuracy SA. Thus, decision blocks 232, 242, 252 and 262 first preferably determine which of the adjustment amounts (Δa, Δb, Δc and Δd) is greatest in magnitude. For example, if it is determined that Δa is greater than each of the adjustment amounts Δb, Δc and Δd, then decision block 232 directs the system to block 234.

Block 234 tests a modified regression model (m−1) where a=a−Δa/2. If the modified regression model results in improved statistical accuracy such that:

$$SA(TEST) > SA(m-1)$$

then decision block 236 directs the system to block 238. Block 238 inverts and reduces the adjustment amount Δa=−(Δa/2) and reinitializes the counts CO and IN to zero. Block 240 reinitializes the patent count to n=1. The system then resumes normal operation starting at block 206.

If the modified regression model does not result in improved statistical accuracy, decision block 236 directs the system to the next decision block 242 to determine whether an adjustment to one of the other coefficients might improve the accuracy of the regression model. The process of adjusting the coefficients and testing the accuracy of a new adjusted regression model repeats until decision block 262 determines that the system has cycled through a predetermined number of models, in this case m=1000. At this point the system stops at END block 270, whereby the data may be extracted and studied or used to provide quality ratings or rankings of patents outside (or inside) the study populations as described above. If there are any non-linear relationships between the criterion variable and any predictor variable(s), it is preferred to randomize the variable coefficients at least periodically and reconverge toward an optimal solution in order to fully explore all possible optimal solutions.

Multiple regression modeling, as described above in connection with FIG. 2, is particularly well suited to carrying out the rating methods of the present invention. The methodology allows one not only to determine a statistical relationship between a criterion variable (CV) of interest and a number of predictor variables (PVs), it also allows one to determine the independent contributions of each predictor variable in the model by allowing for partitioning of variance. In other words, one can determine how much variance in the criterion variable is accounted for by a specific predictor variable. This can be accomplished, for example, by removing the PV in question from the model and then determining if the correlation predicted by the model significantly declines when the predictor variable is removed from the equation and the other predictor variables remain.

Partitioning of variance is also useful in detecting possible collinearity or multi-collinearity between two of more predictor variables. Collinearity occurs when all or most of the variance in one predictor variable is accounted for by one other predictor variable. Multi-collinearity exists when several predictor variables combined account for all or most of the variance of another predictor variable. While not directly detrimental to the utility of the invention, collinearity or multi-collinearity can create problems where it is desired to accurately determine the slope or direction of an individual regression line for a particular predictor variable. Collinearity or multi-collinearity can be reduced or eliminated by removing superfluous predictor variables and/or by combining two or more predictor variables into a single normalized predictor variable.

EXAMPLE APPLICATIONS

Having thus described the preferred embodiments of the invention in detail those skilled in the art will recognize that the basic concepts and principles disclosed herein may be applied and implemented in a wide variety of useful ways to achieve desired results. A few examples are provided below by way of illustration in order to demonstrate the broader utility of the invention and how it may be used commercially.

Example 1

One possible application of the present invention is to identify and study relevant characteristics from a sample of litigated patents to determine and measure those patent metrics that are predictive of a possible future event, such as a patent being litigated. Patent litigation is the ultimate attestation of patent value. A patent plaintiff is faced with enormous legal costs to bring and prosecute a patent infringement action. Thus, the decision to invest such substantial sums to enforce a patent is potentially (although, not necessarily) a strong indicator of the strength and value of the underlying patent asset.

Figure 3:
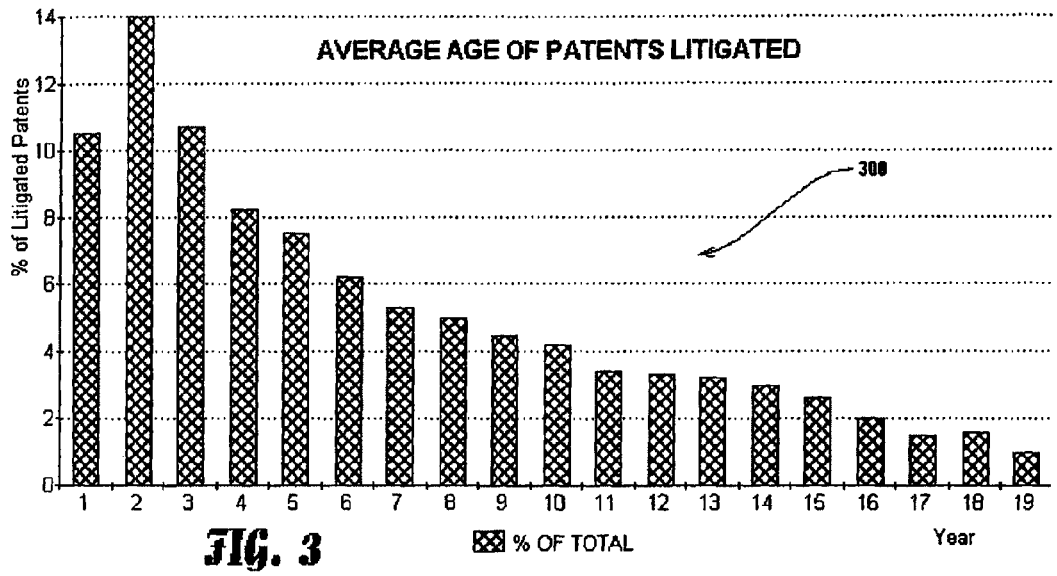
FIG. 3 is a graph of percentages of litigated patents according to age, illustrating the declining incidence of patent litigation with patent age.

A study of statistical data representing about 1200 litigated patents reveals several interesting patterns which can help predict whether a particular patent will be litigated. One pattern that is immediately evident is that patents are typically litigated relatively early in their lives. FIG. 3 is a graph of the average age of a selected sample of litigated patents. This graph indicates that most patents (>50%) that are litigated are litigated within five years from the date of issuance. The decrease in the incidence of patent litigation with age suggests that patents may have a diminishing value over time. This is generally consistent with what one might expect as newer technology replaces older technology. Thus, using the graph of FIG. 3 and knowing the age of a particular patent(s) of interest (all other things being assumed equal), one can estimate the probability of the patent(s) being litigated within one year, two years, three years, etc., in the future.

Another interesting pattern is that foreign originating patents (i.e., patents claiming priority to a foreign parent application) are much less likely to be litigated than domestic originating patents. For example, a study of the relevant data reveals that 0.67% of all patents issued in 1990 were litigated, compared to 0.16% of foreign originating patents. Moreover the incidence of patent litigation varies significantly with country of origin. Only 0.10% of all Japanese originating patents issued in 1990 were litigated compared to 0.38% of U.K. originating patents and compared to 0.15% of German originating patents. These differences may reflect disparities in the relative costs of litigation for various foreign patentees as well as language and cultural differences.

Each of the patent metrics identified above is anticipated to have a statistically significant impact on the probability of a patent being litigated in the future. By undertaking a statistical study of these and other patent metrics and by constructing a suitable regression model in accordance with the invention disclosed herein, one can calculate an estimated statistical probability of a given patent being litigated during a predetermined period of time in the future based on the identified patent characteristics. If desired, a numerical rating or ranking may be assigned to each patent indicating the relative likelihood of litigation.

Example 2

Another possible application of the present invention is to identify and study relevant characteristics from a sample of litigated patents to determine and measure those patent metrics that are predictive of a particular desired outcome in litigation (e.g., a finding of infringement and/or invalidity).

For example, it is a commonly-held notion among patent professionals that certain claim language or claim limitations can have narrowing effects on the scope of patent claims. Claims that are very long and recite many detailed limitations or that recite limitations in the form of "means plus function" language and the like can significantly restrict the scope of patent claims. Therefore, it is anticipated that patent metrics reflecting such qualities (e.g., large number of words per claim, or large number of different words per claim, use of "means" language and the like) will have a statistically significant negative correlation with favorable litigation results.

Table 1 below, summarizes the incidence of final judgements of infringement for 665 reported patent infringement cases brought in the U.S. federal district courts between 1987 and 1998. The results are divided according to whether one or more of the asserted claim(s) contained a "means" limitation.

TABLE 1

| Asserted Claim | % Infringed |
|---|---|
| "Means" | 47.1 |
| "Non-Means" | 51.2 |

As indicated in Table 1, above, asserted patent claims that contained at least one "means" limitation were found to be infringed about 8.7% (4.1% in absolute percentage terms) less often than asserted patent claims that did not contain a means limitation. This supports the notion that "means" limitations have a narrowing effect on claim breadth.

Figure 4:
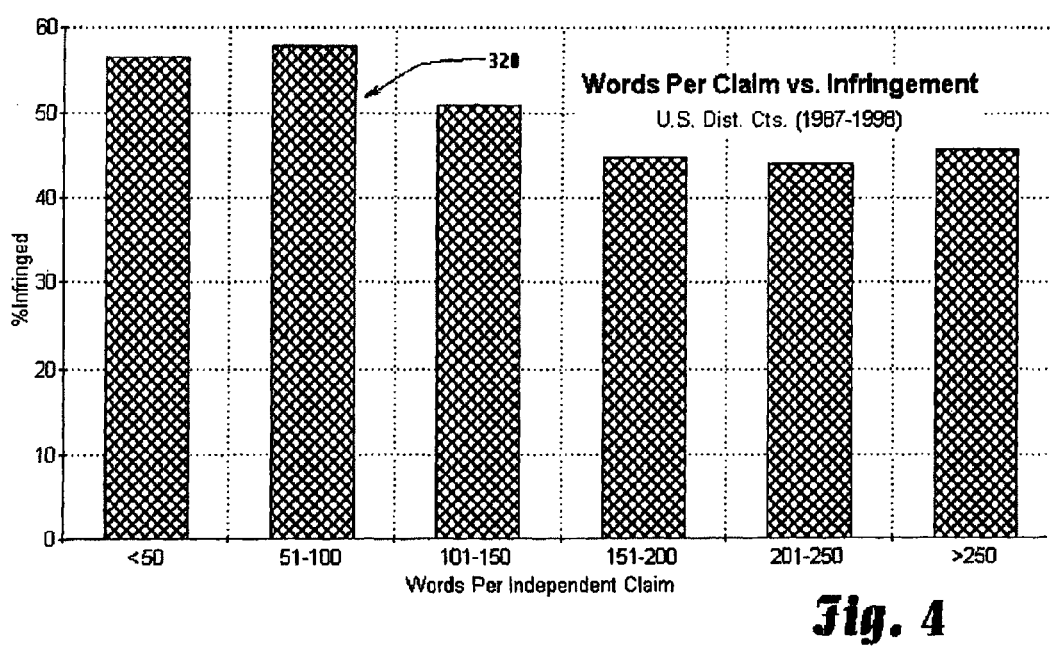
FIG. 4 is a graph of percentages of litigated patents found to be infringed by a federal district court according to the average number of words per independent claim, illustrating the declining incidence of patent infringement with length of patent claim.

Similarly, FIG. 4 is a graph 320 of percentages of litigated patents found to be infringed by a federal district court between 1987 and 1998, illustrating a statistical relationship between the incidence of infringement and the average number of words or "word count" per independent claim. The graph generally illustrates a declining incidence of patent infringement with increasing word count. Again, this supports the generally-held notion that longer claims are narrower than shorter claims. Of course, those skilled in the art will recognize that more sophisticated relationships could also be established and characterized statistically.

For example, a modified word count metric comprising only non-repeated words per claim could be used. Alternatively, each word and/or word phrase in a patent claim could be assigned a point value according to its frequency of use in a randomly selected population of similar patents in the same general field. Statistically common words or word phrases such as simple articles, pronouns and the like would receive relatively low point values. Uncommon words or word phrases would receive relatively high point values. The total point score for each claim would then be an indication of its relative breadth or narrowness based on the total number and statistical prevalence of each of the words contained in the claim. Optionally, different amounts of points can be accorded to claim words or word phrases based on whether or not such words or word phrases also appear in the patent specification. Multiple claims and/or patents could also be combined into a single such analysis, if desired.

If multiple independent claims are being considered for each patent, it may be helpful to develop a "relatedness index" metric which characterizes the relatedness of each claim to one or more other claims of the patent (and/or one or more other patents). All other things being equal, it is expected that a patent having two or more claims that are highly related to one another (e.g., having substantially overlapping claim coverage) would be narrower in overall scope than a patent having two or more claims that are substantially dissimilar from one another (and, therefore, likely cover different subject matter). One convenient way to formulate a relatedness index is to compare the number of words that are common to each claim versus the number of words that are unique to each claim. For example, a first claim of interest (Claim 1) may contain 95% of the same words in common with a second claim of interest (Claim 2). Therefore, the two claims could be described as having a relatedness index ($R_{1,2}$) of 95% or 0.95. However, a third claim of interest (Claim 3) may contain only 45% of the same words in common with the first claim (Claim 1). Therefore, these two claims could be described as having a relatedness index ($R_{1,3}$) of 45% or 0.45. More sophisticated approaches could further weight or score each word in accordance with frequency of use as described above, and/or could provide for matching of similar or synonymous words. A relatedness index metric could also be developed and used to compare the relatedness or apparent relatedness of one or more patent specifications. This could be useful, for example, in identifying related or similar patents within a portfolio.

Figure 5:
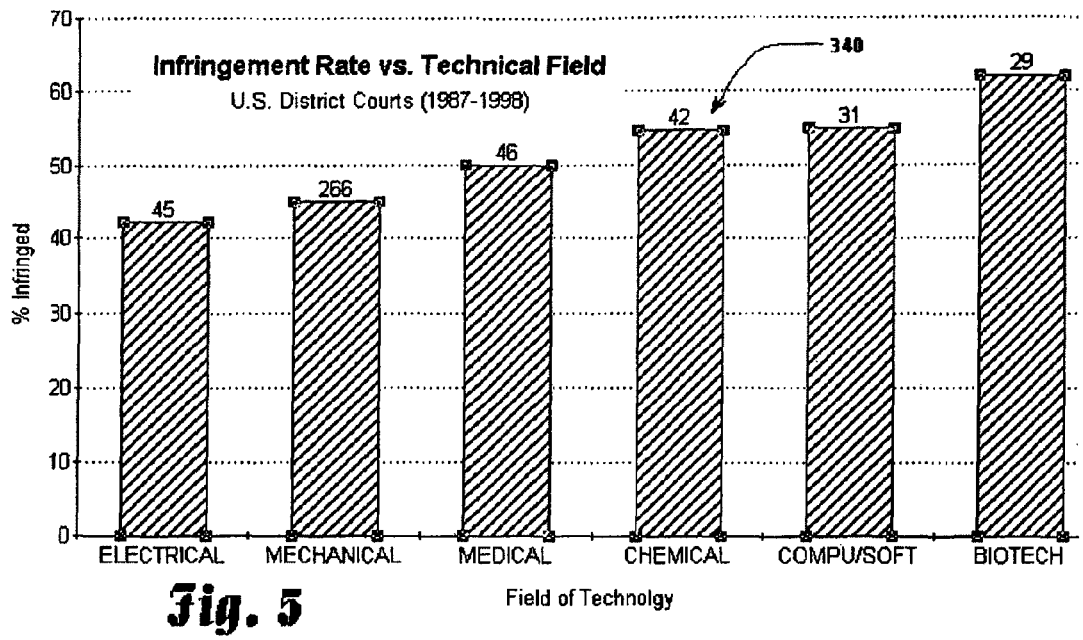
FIG. 5 is a graph of litigated patents according to technical field, illustrating the incidence of patent infringement holdings by field.
Figure 6:
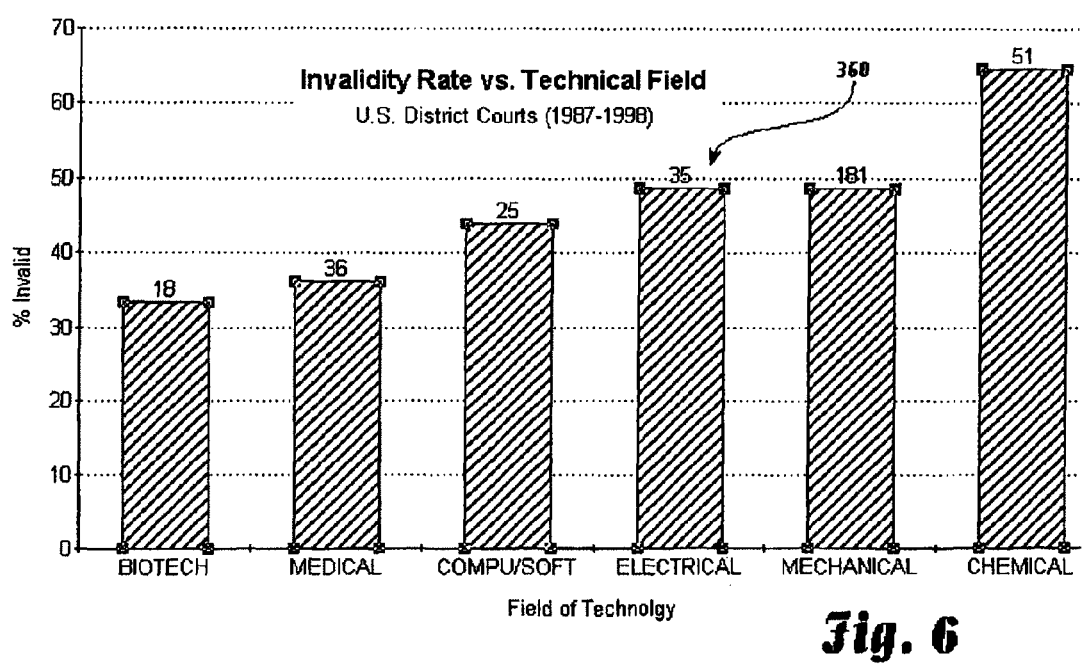
FIG. 6 is a graph of litigated patents according to technical field, illustrating the incidence of patent invalidity holdings by field.

FIG. 5 is a graph 340 of litigated patents according to technical field, illustrating the incidence of patent infringement holdings by field. Similarly, FIG. 6 is a graph 360 of litigated patents according to technical field, illustrating the incidence of patent invalidity holdings by field. In each case, the numbers above each bar indicate the sample size of each patent population reported. Each of these graphs illustrates a statistical relationship between the general technical field of an invention and the incidence of validity or infringement holdings in litigation.

Figure 7:
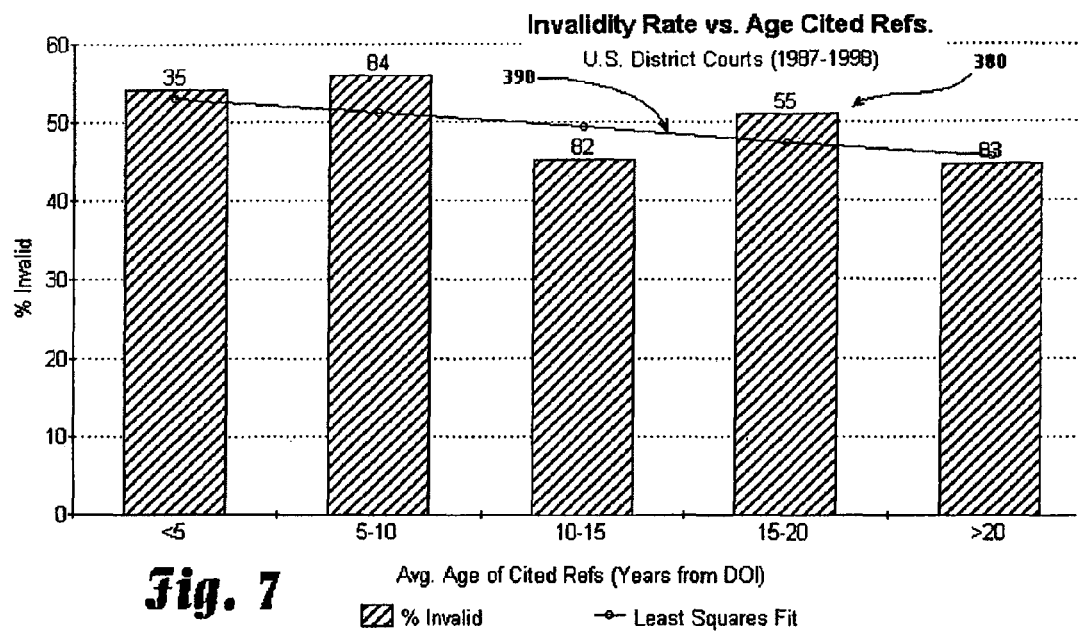
FIG. 7 is a graph of percentages of litigated patents found to be invalid by a federal district court according to the average age of cited U.S. patent references, illustrating the declining incidence of patent invalidity with citation age.

FIG. 7 is a graph 380 of percentages of litigated patents found to be invalid by a federal district court according to the average age of U.S. patent references cited therein. In particular, the graph 380 illustrates a declining incidence of patent invalidity with citation age. Curve 390 is a representative trend line having the general equation:

$$Y = mX + B$$

where: Y=Y-coordinate value (% infringement)
X=X-coordinate value (avg. age cited refs. in years)
m=slope of line (% infringement/#years)
b=Y-axis intercept The slope (m) and Y-axis intercept (b) of curve 390 were determined by trial and error to produce an ordinary least squares fit to the data reported by graph 380. Thus, the curve 390 (and the resulting formula thereof) is generally representative of the statistical relationship between average citation age and incidence of patent validity in litigation.

In each of the cases described above, the identified patent metrics are anticipated to have a statistically significant impact on the probability of a patent being litigated successfully or unsuccessfully. By undertaking a statistical study of these and other identified patent metrics and by constructing a suitable regression model in accordance with the invention disclosed herein, one can accurately calculate an estimated statistical probability of a given patent being successfully litigated (found valid and/or infringed), taking into consideration all of the identified patent characteristics and statistical relationships simultaneously. If desired, a numerical rating or ranking may be automatically calculated and assigned to each patent indicating the relative likelihood of a particular event or quality. Such rating may be provided for the patent as a whole or, alternatively (or in addition), individual ratings may be provided for one or more individual claims of the patent, as desired.

Example 3

In the United States and most foreign countries, patentees are required to pay periodic maintenance fees during the term of a patent to maintain the patent in force. In most countries, these consist of fixed annual fees of $200-300 per year paid to the government patent office to maintain a patent in force. In the United States, maintenance fees are paid every four years and escalate progressively from $525/$1,050 to maintain a patent in force beyond the fourth year, to $1,050/$2,100 to maintain a patent in force beyond the eighth year, to $1,580/$3,160 to maintain a patent in force beyond the twelfth year. Patentees that qualify as a "small entity" pay the smaller amounts; all others pay the larger amounts.

The relatively substantial and escalating nature of these periodic maintenance fee payments has the effect of discouraging the maintenance for the full-term of all but the most successful or valuable patents. Thus, such patent maintenance fee data provides a unique, introspective look at how patentees themselves value their own patents. A reasonable and economically motivated patentee would not pay to maintain his or her patent if the cost of the maintenance fee exceeded the reasonable expected future benefit likely to be gained by maintaining the patent in force for an additional four year period. Thus, PTO records reflecting the payment or non-payment of periodic maintenance fees by patentees provides a wealth of data from which a wide variety of useful information may be derived. Such information is useful, for example, for purposes of conducting patent valuations, patent rankings, patent ratings, and/or for other purposes as generally taught herein.

Thus, another possible application of the present invention is to identify and study relevant characteristics of a sample population of 20,000-80,000 patents that have been maintained beyond the first, second or third maintenance periods as against a sample population of 20,000-80,000 patents that have not been maintained or are abandoned prior to the expiration of their statutory term. In this manner, one may determine and measure with a high-level of statistical accuracy (i.e., greater than 95% confidence) those patent metrics that are predictive of patents being abandoned prior to expiration of their full term. Moreover, one may determine with a similar degree of statistical accuracy the particular relationship or contribution provided by one or more individual patent metrics of interest. This may be accomplished, for example, using variance partitioning and/or other similar statistical analysis techniques.

Figure 8:
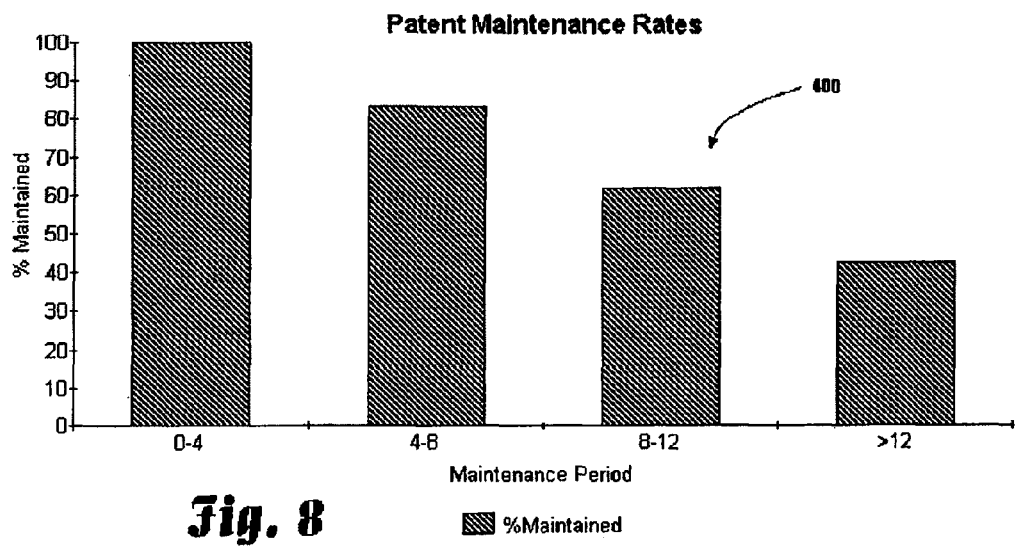
FIG. 8 is a graph of overall patent maintenance rates for patents in the general patent population, illustrating increasing rates of patent mortality with age.

In this case, a study of the statistical data reveals several interesting patterns that may help predict whether a particular patent will be abandoned or maintained beyond its first, second or third maintenance period. FIG. 8 is a graph of patent maintenance rates for a random sample population of patents issued in 1986. This graph 400 indicates that approximately 83.5% of such patents were maintained beyond the fourth year, approximately 61.9% of the patents were maintained beyond the eighth year and approximately 42.5% of the patents were maintained beyond the twelfth year. In other words, all but about 42.5% of the sample population were abandoned or allowed to expire before the full statutory patent term. This corresponds to an overall average patent mortality (abandonment) rate of approximately 58.5%. From this and/or other similar data one can formulate certain general expectations or probabilities as to whether a patent will likely be maintained or abandoned in the future.

More specific expectations and probabilities can be formulated by identifying and/or measuring those specific patent metrics associated with patent populations having either high or low mortality rates. For example, the data reveals that Japanese originating patents generally have lower mortality rates than domestic originating patents (44.7% vs. 58.5%). The data also reveals that patents classified by the PTO in different classes and/or subclasses can have significantly different mortality rates. For example, Table 2 below illustrates various observed mortality rates for patents categorized in several selected PTO classes:

TABLE 2

| CLASS | DESCRIPTION | MORTALITY |
|---|---|---|
| 482 | Exercise Equipment | 79% |
| 473 | Golf Clubs/Equipment | 74% |
| 434 | Golf Training Devices | 71% |
| 446 | Toys and Amusement Devices | 70% |
| 206/250 | Packaging | 57% |
| 365/364 | Computers | 45% |
| 935 | Genetic Engineering | 44% |

As Table 2 illustrates, patent mortality rates can vary dramatically depending upon the general subject matter of the patented invention as determined by the PTO classification system. Thus, one can reasonably conclude that, all other things being equal, certain classes of inventions are probably more valuable (more likely to be maintained) or less valuable (less likely to be maintained) than certain other classes of inventions. From this and/or other similar data one can formulate specific and/or more accurate expectations or probabilities as to whether a particular patent having certain identified characteristics will likely be maintained or abandoned in the future.

Figure 9:
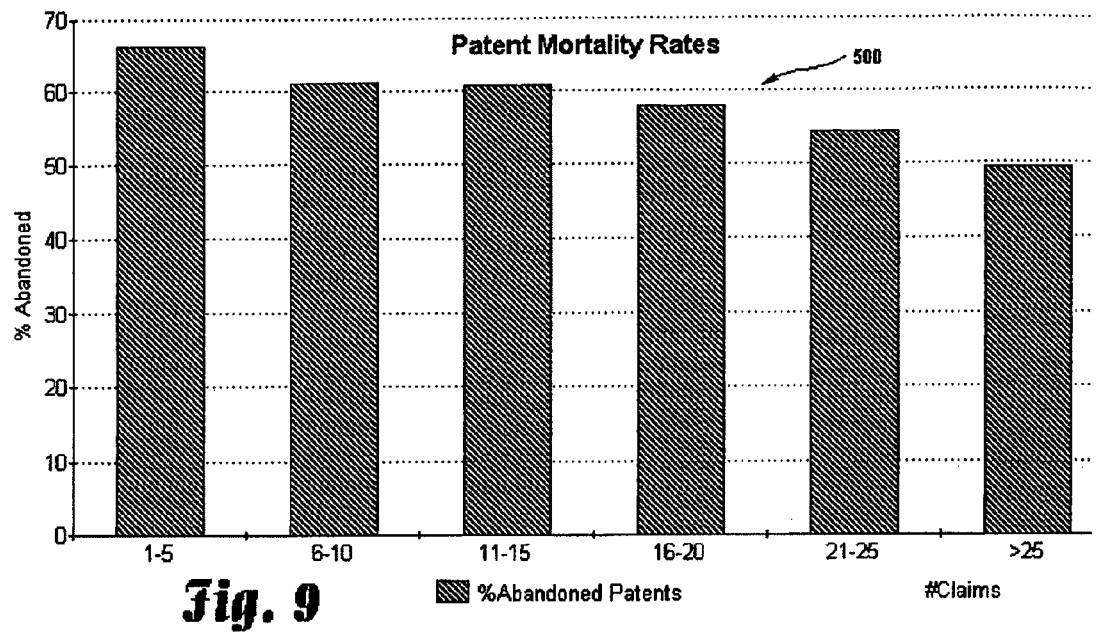
FIG. 9 is a graph of patent mortality rates for patents having different numbers of claims, illustrating decreasing mortality rates with increasing number of claims.

FIG. 9 illustrates a similar observed correlation between the number of claims contained in a patent and the patent mortality rate. In particular, for patents having five or fewer claims the average mortality rate is observed to be about 66.3%. However, for patents having greater than 25 claims the mortality rate is observed to drop to 49.3%. Again, this indicates that, all other things being equal, patents having more claims are probably more valuable (more likely to be maintained) than patents having less claims.

Figure 10:
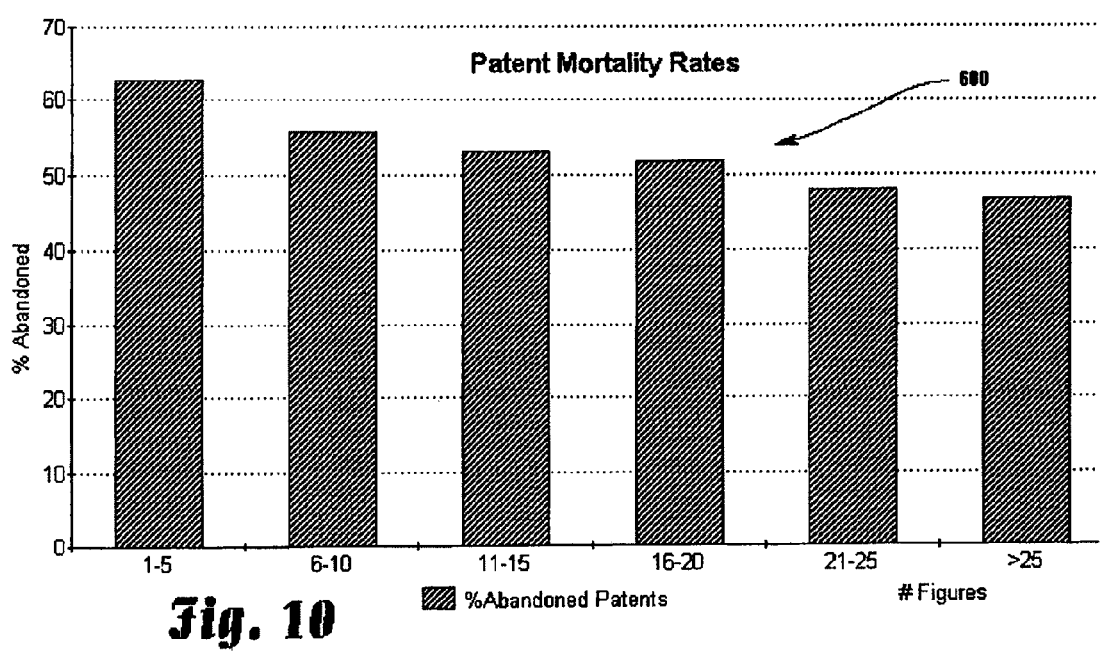
FIG. 10 is a graph of patent mortality rates for patents having different numbers of figures, illustrating decreasing mortality rates with increasing number of figures.

FIG. 10 illustrates another similar observed correlation between the number of figures or drawings contained in a patent and the patent mortality rate. In particular, for patents having five or fewer figures the average mortality rate is observed to be about 62.7%. However, for patents having greater than 25 figures the mortality rate is observed to drop to 46.6%. Again, this indicates that, all other things being equal, patents having more figures (and presumably more disclosure) are probably more valuable (more likely to be maintained) than patents having less figures.

At least one study has reported that the number of citations subsequently received by a patent ("forward" citations) may also have a positive correlation with economic value. See, e.g., Harhoff et al., "Citation Frequency and the Value of Patented Innovation, ZEW Discussion Paper No. 97-27 (1997). Assuming this is true, one would expect to see a relatively low mortality rate for patents that receive an above-average number of forward citations and a relatively high mortality rate for patents that receive a below-average number of forward citations. This can be easily verified and statistically measured using the methods taught herein.

Each of the patent metrics identified above is anticipated to have a statistically significant impact on the probability of a patent being maintained or abandoned, litigated successfully or unsuccessfully, etc. By undertaking a statistical study of these and other patent metrics and by constructing a suitable regression model or algorithm in accordance with the invention disclosed herein, one can calculate with a statistically determined accuracy an estimated probability of a particular patent quality or a particular event occurring affecting a given patent. If desired, a numerical rating or ranking may be assigned to each patent indicating its relative value or score. Multiple ratings or rankings may also be provided representing different qualities of interest or probabilities of particular future events occurring.

Patent Ratings, Valuations & Reports

Patent ratings or rankings as taught herein may be compiled and reported in a variety of suitable formats, including numerical ratings/rankings, alphanumeric ratings/rankings, percentile rankings, relative probabilities, absolute probabilities, and the like. Multiple ratings or rankings may also be provided corresponding to different patent qualities of interest or specific patent claims. FIG. 11 illustrates one possible form of a patent rating and valuation report 700 that may be generated in accordance with a preferred embodiment of the invention.

As illustrated in FIG. 11, the report 700 contains some basic data 710 identifying the patent being reported, including the patent number, title of the invention, inventor(s), filing date, issue date and assignee (if any). Several individual patent ratings 720 are also provided, including overall patent breadth ("B"), defensibility ("D"), and commercial relevance ("R"). Breadth and Defensibility ratings are preferably generated by a computer algorithm that is selected and adjusted to be predictive of known litigation outcomes (e.g., infringement/non-infringement and validity/invalidity) of a selected population of litigated patents based on various comparative patent metrics. Relevance ratings are preferably generated using a computer algorithm selected and adjusted to be predictive of patent maintenance rates and/or mortality rates based on various comparative patent metrics including, preferably, at least one comparative metric based on a normalized forward patent citation rate (normalized according to patent age). If desired, each of the B/D/R ratings can be statistically adjusted relative to the remaining ratings using known statistical techniques so as to minimize any undesired collinearity or overlap in the reported ratings.

In the particular example illustrated, ratings 720 are provided on a scale from 1 to 10. However, a variety of other suitable rating scales may also be used with efficacy, such as numerical rankings, percentile rankings, alphanumeric ratings, absolute or relative probabilities and the like. If desired, individual ratings or rankings 720 may also be combined using a suitable weighting algorithm or the like to arrive at an overall score or rating 730 for a given patent, patent portfolio or other intellectual property asset. The particular weighting algorithm used would preferably be developed empirically or otherwise so as to provide useful and accurate overall patent rating information for a given application such as investment, licensing, litigation analysis, etc.

For investment purposes, for example, overall ratings may be provided in the form of convenient bond-style ratings as summarized in Table 3 below:

TABLE 3

| Quality | Rating |
| --- | --- |
| Highest quality | AAA |
| High quality | AA |
| Medium-high quality | A |
| Upper medium quality | BBB |
| Medium quality | BB |
| Lower medium quality | B |
| Medium-low quality | CCC |
| Low quality | CC |
| Lowest quality | C |

If desired, such overall ratings can be separately collected and tabulated for use as a handy reference source. For example, overall patent ratings can be published and updated periodically for all patents currently in force and/or for all newly issued patents published by the PTO, providing simple and useful information to those who desire to use it. Such information could also advantageously be stored on a searchable database accessible through an Internet-based web server or the like.

To accomplish this purpose, the invention may be modified and adapted to provide high-speed, automated scoring or rating of a sequential series of newly issued patents periodically published by the PTO. According to the preferred method, a substantial full-text copy of each patent in the sequential series is obtained in a computer text file format or similar computer-accessible format. A computer program is caused to automatically access and read each computer text file and to extract therefrom certain selected patent metrics representative of or describing particular observed characteristics or metrics of each patent in the sequential series. The extracted patent metrics are input into a previously determined computer regression model or predictive algorithm that is selected and adjusted to calculate a corresponding rating output or mathematical score that is generally predictive of a particular patent quality of interest and/or the probability of a particular future event occurring. Preferably, for each patent in the sequential series a rating output or mathematical score is directly calculated from the extracted metrics using a series of predefined equations, formulas and/or rules comprising the algorithm. The results are then preferably stored in a computer accessible memory device in association with other selected information identifying each rated patent such that the corresponding rating may be readily referenced or retrieved for each patent in the sequential series.

Because the rating method in accordance with the modified embodiment of the invention described above directly calculates (for each patent or group of patents) the mathematical score or rating from the patent metrics themselves, there is no need to access related stored data, such as comparative representative patent data, from an associated database. Thus, the method can be carried out very rapidly for each patent in the sequential series. For example, using a high-speed computer executing a predetermined predictive algorithm the automated rating method described above can preferably be carried out in less than about 1-3 minutes per patent, more preferably in less than about 30-45 seconds per patent, and most preferably in less than about 5-10 seconds per patent. Moreover, because the predictive algorithm operates without requiring access to any comparative representative data, it may be easily stored, transferred, transported or otherwise communicated to others without the need to also store, transfer, transport or communicate the underlying comparative data used to develop the algorithm.

While it is preferred to provide independent B/D/R ratings and/or an overall score for each rated patent asset, those skilled in the art will recognize that numerous other ranking or rating systems may be used with efficacy in accordance with the teachings herein. For example, individual patent/claim scores may be ranked relative to a given population such that ratings may be provided on a percentile basis. Alternatively, numerical and/or alphanumerical scores may be assigned on a scale from 1-5, 1-9, 1-10, or A-E, for example. Optionally, and as illustrated in FIG. 11, each claim of the reported patent may be analyzed and rated separately if desired. In that case, each claim 1-9 in the example illustrated in FIG. 11) is preferably indicated as being either independent ("I") or dependent ("D"), as the case may be. Alternatively, only the independent claims of a reported patent may be rated if desired.

Individual ratings 740, 750 and 755 in report 700 preferably provide numerical ratings (1-10) of the likely breadth ("B"), defensibility ("D"), and relevance ("R") of each claim of the reported patent (and/or the patent as a whole). Such "BDR" ratings may alternatively be expressed in a variety of other suitable formats, such as letters, symbols, integer numerals, decimal numerals, percentage probabilities, percentile rankings, and the like. For example, a letter scoring system (e.g., A-E) could be assigned for each of the individual B/D/R components. In that case, a BDR rating of "B/A/A" would represent a "B" rating for breadth, and "A" ratings for both defensibility and relevance. An overall rating could then be derived from the individual BDR component ratings using a suitable conversion index rating system as generally illustrated below in Table 4:

TABLE 4

| BDR Rating | Overall Rating |
| --- | --- |
| A/A/A | AAA |
| A/A/x | AA |
| A/x/A | AA |
| x/A/A | AA |
| A/x/x | A |
| x/A/x | A |
| x/x/A | A |
| B/B/B | BBB |
| B/B/x | BB |
| B/x/B | BB |
| x/B/B | BB |
| B/x/x | B |
| x/B/x | B |
| x/x/B | B |
| C/C/C | CCC |
| C/C/x | CC |
| C/x/C | CC |
| x/C/C | CC |
| C/x/x | C |
| x/C/x | C |
| x/x/C | C |
| x/x/x | D |

In the above Table 4, "x" represents an individual component rating (either B, D or R) that is lower than the highest of the remaining rating component(s) such that only the highest component rating(s) are reflected in the overall rating. Thus, a BDR rating of A/A/B or A/B/A would each produce an overall rating of "AA." Likewise, a BDR rating of C/B/C or B/D/E would each produce an overall rating of "B." Optionally, various additional rules and/or weighting formulas may be used to adjust the overall rating assigned in accordance with this system. For example, if one or more of the low component ratings "x" is two or more rating levels below the highest component rating(s) then the overall rating can be decreased by one increment. Thus, a BDR rating of C/B/C would produce an overall rating of "B" whilst a BDR rating of B/D/E would produce an overall rating of "CCC" or "CC". Preferably, if no individual component rating is at least a "C" (or other predetermined rating level) or higher, then the overall rating is assigned some arbitrary baseline rating, such as "D" or "C" or "S" and/or the like.

Preferably, estimated maintenance rates 760 are also provided and are indicated as percentage probabilities for each maintenance period. Alternatively, maintenance data may be provided in a number of other suitable formats, as desired, such as percentile rakings, absolute or relative probabilities and the like. Also, various confidence levels may be calculated and displayed for each of the reported probabilities 760, if desired.

Optionally, the report 700 may further include an estimated valuation range 770 or expected value of the reported patent. Such patent valuation 770 may be based on a variety of suitable techniques that preferably take into account the rating information provided herein. For example, a modified cost-basis approach could be used whereby the cost-basis is multiplied by a suitable discount or enhancement factor corresponding to the rating(s) that the patent receives in accordance with the methods disclosed herein. In this manner, patents that receive higher-than-average ratings would be valued at more than their cost basis. Conversely, patents that receive lower-than-average ratings would be valued at less than their cost basis.

Similarly, a modified income valuation approach could be used whereby a hypothetical future projected income stream or average industry royalty rate is multiplied by a suitable discount or enhancement factor corresponding to the rating that the patent receives in accordance with the methods disclosed herein. In this manner, patents that receive higher ratings would be valued at higher than industry averages. Conversely, patents that receive lower ratings would be valued at lower than industry averages.

Figure 12:
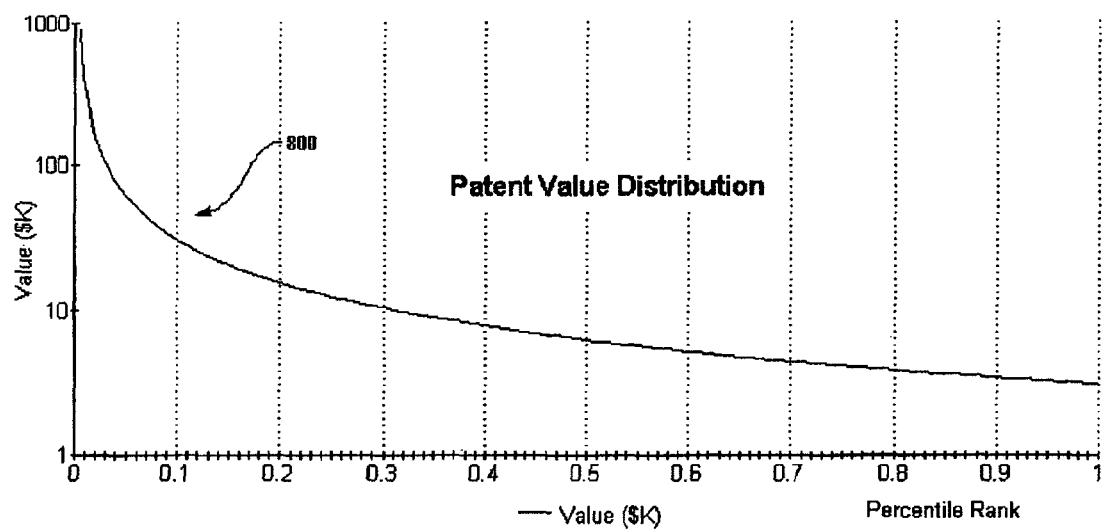
FIG. 12 is one possible example of a patent value distribution curve for use in accordance with one embodiment of a patent valuation method of present invention.

Another preferred approach would be to allocate patent value based on a percentile ranking of patents as determined herein. For this approach an approximated distribution of relative patent values is determined from existing patent renewal data, patent litigation data and/or the like. From this data, a value distribution curve can be constructed such as illustrated in FIG. 12. The shape of the curve generally represents an estimated distribution (e.g., on a percentile basis) of approximated patent values spread over a range from the very highest-value patents to the very lowest-value patents. See also, Hall, "Innovation and Market Value," Working Paper 6984 NBER (1999) (suggesting an extremely skewed value distribution whereby a few patents are extremely valuable, while many others are worth little or almost nothing). The area under the curve 800 preferably corresponds to the total estimated value of all patents in a given patent population (e.g., all U.S. patents currently in force). This can be readily estimated or approximated by applying suitable macro-economic analysis. For example, it may be approximated as a percentage of total GNP, or as a percentage of total market capitalization of publicly traded companies, or as a multiple of annual budgeted PTO fees and costs, and/or the like.

Patents having the highest percentile rankings in accordance with the rating methods disclosed herein would then be correlated to the high end of the value distribution curve 800. Conversely, patents having the lowest percentile rankings in accordance with the rating methods disclosed herein would then be correlated to the low end of the value distribution curve 800. Advantageously, such allocative valuation approach brings an added level of discipline to the overall valuation process in that the sum of individual patent valuations for a given patent population cannot exceed the total aggregate estimated value of all such patents. In this manner, fair and informative valuations can be provided based on the relative quality of the patent asset in question without need for comparative market data of other patents or patent portfolios, and without need for a demonstrated (or hypothetical) income streams for the patent in question. Estimated valuations are based simply on the allocation of a corresponding portion of the overall patent value "pie" as represented by each patents' relative ranking or position along value distribution curve 800.

Alternatively, any one or more of the above valuation techniques (or other techniques) can be combined or averaged to produce appropriate valuation ranges and/or various blended valuation estimates, as desired. Various confidence levels may also be calculated and reported for each of the reported value ranges 770. Alternatively, several different value ranges can be calculated according to different desired confidence levels.

Internet Applications

The present invention is ideally suited for Internet-based applications. In one preferred embodiment, the invention would be made available to Internet users on the World Wide Web ("the web"), or a similar public network, and would be accessible through a web page. Various services, embodying different aspects of the present invention, could be made available to users on a subscription or a pay-per-use basis.

In an Internet-based application, users would preferably have access to automated patent ratings, consolidated patent ratings (i.e. grouped by technology, business sector, industry, etc.), and a host of ancillary information regarding particular patents or groups of patents. Ancillary information may include, for example, full-text searchable patent files, patent images, bibliographic data, ownership records, maintenance records, and the like. A user would preferably be able to enter or "click" on the number of a patent he or she was interested in and obtain, in very short order (e.g., in less than about 1-5 minutes), a comprehensive rating report as described above. Preferably, the user would be able to control most, if not all, of the variables in the rating calculation. Thus, for instance, he or she could request that the patent be rated only against other patents in the same art group, or in a specific industry, or in a particular field of use. He or she could request a report on how the patent compares to all patents that have been litigated in the past 5 years, or that have been held invalid by U.S. courts. In this manner, reports could be narrowly tailored to the specific interests and concerns of the user. This is beneficial—though not critical—because different types of users, e.g., lawyers, businessmen, manufacturers, investors, etc., will have slightly different appraisal needs.

In another preferred embodiment, it is not necessary that a user actually know the patent number or title of the patent he or she wishes to have rated. Instead, this preferred embodiment would include a series of correlation tables which allow the user to retrieve patent numbers based on ownership, field of use, or even specific commercial products. Thus, it would be possible for a user to request reports on all patents that have been issued or assigned to a particular company in the past 5 years.

Ideally, it would also be possible for a user to request reports on all patents associated with a specific commercial product. Such product patent information could advantageously be collected and stored on a centralized, searchable computer network database or the like in order to allow users to search and obtain patent information on particular commercial products. Relevant patent marking data could be gathered either through private voluntary reporting by manufacturers of such products and/or it may be gathered through other available means, such as automated web crawlers, third-party reporting or inputting and the like. Patent marking data (e.g., the presence or absence of a patent notice on a corresponding commercial product) and/or other relevant data (e.g., sales volume, sales growth, profits, etc.) could provide additional objective metric(s) by which to rate relevant patents in accordance with the invention. Presumably, patents that are being actively commercialized are more valuable than "paper patents" for which there is no corresponding commercial product. Optionally, the patent marking database can also include the necessary URL address information and/or the like which will allow users to hot-link directly to a third-party web page for each corresponding product and/or associated product manufacturer.

In another embodiment of the invention, users would be allowed to request automatic updates and patent ratings according to certain user-defined parameters. Thus, a user who is particularly interested in the XYZ company could request an automatic updated report—sent to him substantially contemporaneously (preferably within a few days, more preferably within about 2-3 hours, and most preferably within less than about 5-10 minutes) via e-mail and/or facsimile—whenever the XYZ company obtains a newly issued patent. A similar updated report could be generated and sent any time a new patent issued or a new application is published in a particular technology field or class of interest. The updates would preferably contain a synopsis of each new patent or published application, as well as a patent rating performed according to that user's preferred criteria. Updated reports for each rated patent could also be generated periodically whenever one or more identified patent metrics changed (e.g., forward citation rate, change of ownership, litigation, etc.). Such automated updating of rating information would be particularly important to investment and financial analysts, who depend on rapid and reliable information to make minute-by-minute decisions. Updated report(s) could also be generated and published each week for all newly issued patents granted by the PTO for that current week. Thus, in accordance with one preferred embodiment of the invention, informative patent rating and/or ranking information may be provided within days or hours of a new patent being issued and published by the PTO.

Another service that may be provided in a preferred Internet-based application of this invention is a user-updated information database. According to this embodiment, certain users and/or all users would be allowed to post information they believe is pertinent to a particular patent or group of patents. Such information might include prior art that was not cited in the patent, possible license terms, potential problems with the written description or claims of the patent, information about the inventors, information relating to sales of patented products prior to the filing date, legal opinions, related litigation, and any other information that might be relevant to the patent. The information would preferably be stored and displayed in association with each particular patent to which it is relevant. Thus, from the user's perspective each patent would, in effect, have its own bulletin board or note pad associated with it, upon which users may post relevant information. Other information could also be displayed, such as license terms available, commercial product information, other patents of interest, electronic file wrappers, hot-links to other sites, and the like.

Optionally, submitters could also provide their own rating or ranking of the patent in question, such that patents could be essentially self-rated by users. In the preferred embodiment, only qualified users (or selected patent analysts) would be allowed to post such ratings. The qualification process could be as simple as filling out a questionnaire or as thorough as an independent verification of credentials. It is also possible to employ the methodology currently used by such web sites as "epinions.com" to track the popularity and veracity of individual user-submitted information and determine which users are most trusted. Those users that are most trusted would be brought to the top of the patent information database and their authors compensated according to the number of times users accessed the information, while less-popular submitters' information would sink in rank. Users and/or analysts could also be compensated financially (or otherwise) based on the accuracy of their ratings relative to the collective rating prediction and/or relative to the occurrence of a predicted future event. This would motivate more careful analysis and more accurate ratings. See, U.S. Pat. No. 5,608,620, incorporated herein by reference, for a description of a collective prediction and forecasting method using multiple individual forecasters, which may be readily adapted and applied to the present invention as disclosed herein.

The present invention is also well suited for incorporation into a newsletter service, such as the numerous financial newsletters currently available to Wall Street investors. In this embodiment of the invention, the rating system described herein would preferably be applied to a pre-defined subset of issued patents—for instance, all patents newly issued to "Fortune 500" companies or designated "Pre-IPO" companies. Overall patent ratings would be denoted with a standardized system, such as a 1-10 scale, four stars, bond-style ratings, "BDR" ratings and/or the like. Preferably, requested reports would be automatically generated and e-mailed to each subscriber on a periodic basis and/or on an event-triggered basis, as desired. In this way, subscribers would be provided with a standardized method of comparing patent portfolios of various companies from week to week.

While the statistical rating method and system of the present invention is disclosed and discussed specifically in the context of rating utility patents, those skilled in the art will readily appreciate that the techniques and concepts disclosed herein may have equal applicability to rating other types of intellectual property assets, such as trademarks, copyrights, trade secrets, domain names, web sites and the like. Moreover, although this invention has been disclosed in the context of certain preferred embodiments and examples, it will be under-stood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A computer-implemented method for dynamically linking a third-party web page to a dynamically updateable Internet-accessible report estimating a value or value range for a particular identified maintainable intellectual property asset of interest related to a commercial product associated with the third-party web page, the computer-implemented method comprising:
repeatedly monitoring, by an automated web crawler, a plurality of third-party web pages associated with commercial products;
analyzing data accessed by the automated web crawler to determine associations between the commercial products and intellectual property assets;
storing in an electronic database URL address data that links the intellectual property assets with third-party web pages having commercial products determined to be associated with the intellectual property assets;
storing a first series of data comprising selected metrics quantifying certain selected characteristics of a first population of maintainable intellectual property assets for which maintenance fee payments have been made;
storing a second series of data comprising selected metrics quantifying said selected characteristics of a second population of maintainable intellectual property assets for which maintenance fee payments have not been made;
constructing, by a computer system comprising one or more hardware processors, a predictive model based on said stored first and second series of data, said predictive model being operable to generate an estimated ex ante probability that is predictive of the maintenance fee payment having either been paid or not paid relative to each intellectual property asset in said first or second populations of maintainable intellectual property assets;
providing as input to said predictive model a third series of data comprising selected metrics quantifying said selected characteristics of said particular identified maintainable intellectual property asset of interest and operating said predictive model, by the computer system, to calculate an estimated probability of a maintenance fee payment being made in the future relative to said identified maintainable intellectual property asset of interest;
estimating a value distribution curve, the shape of the curve generally representing an approximated or assumed distribution of value by percentile rankings within a selected population of maintainable intellectual property assets;
using said value distribution curve to estimate a value or value range for said particular identified maintainable intellectual property asset of interest based at least in part on a percentile ranking derived from said estimated probability of said maintenance fee either being paid or not being paid in the future relative to said particular identified maintainable intellectual property asset of interest; and
displaying or causing to be displayed via a graphical user interface of an Internet web browser a dynamically updateable interactive report, the interactive report comprising an indication of the estimated value or value range for said particular identified maintainable intellectual property asset of interest, the interactive report further comprising a clickable hyperlink generated based on the stored URL address data, the clickable hyperlink configured to cause the graphical user interface of the Internet web browser to display a third-party web page associated with a commercial product related to said particular identified maintainable intellectual property asset of interest.

2. The computer-implemented method of claim 1 wherein said first and second populations of maintainable intellectual property assets comprise selected samples of issued U.S. patents and wherein said maintenance fee payment comprises payment of the first scheduled maintenance fee for each said maintainable intellectual property asset.

3. The computer-implemented method of claim 1 wherein said first and second populations of maintainable intellectual property assets have roughly the same population size.

4. The computer-implemented method of claim 1 wherein said selected metrics comprise one or more characteristics of each said maintainable intellectual property asset in said first and second populations of maintainable intellectual property assets that are determined or assumed to have either a positive or negative correlation with the payment or non-payment of said maintenance fee.

5. The computer-implemented method of claim 1 wherein said predictive model comprises a multiple regression model that correlates multiple individual predictor variables comprising said selected metrics to a single criterion variable comprising the payment or non-payment of said maintenance fee.

6. The computer-implemented method of claim 5 wherein said multiple regression model has the form:

$$CV_m = f\{PV_1, PV_2 \ldots PV_n\}$$

where: $CV_m$=criterion variable
$PV_n$=predictor variables.

7. The computer-implemented method of claim 1 comprising the further step of automatically generating a maintenance probability report for said identified selected maintainable intellectual property asset of interest, said report including basic information identifying said selected maintainable intellectual property asset of interest and said estimated probability of said maintenance fee being paid or not being paid within a predetermined period of time in the future.

8. A maintenance probability report generated according to the method of claim 7.

9. A system comprising:
an electronic data store configured to at least store data associated with maintainable intellectual property assets; and
a computing system comprising one or more hardware computing devices, said computing system in communication with the electronic data store and configured to at least:
repeatedly monitor, by an automated web crawler, a plurality of third-party web pages associated with commercial products;
analyze data accessed by the automated web crawler to determine associations between the commercial products and intellectual property assets;
store, in the electronic data store, URL address data that links the intellectual property assets with third-party web pages having commercial products determined to be associated with the intellectual property assets;
store, in the electronic data store, a first series of data comprising selected metrics quantifying certain selected characteristics of a first population of maintainable intellectual property assets for which maintenance fee payments have been made;
store, in the electronic data store, a second series of data comprising selected metrics quantifying said selected characteristics of a second population of maintainable intellectual property assets for which maintenance fee payments have not been made;
construct a predictive model based on said stored first and second series of data, said predictive model being operable to generate an estimated ex ante probability that is predictive of the maintenance fee payment having either been paid or not paid relative to each intellectual property asset in said first or second populations of maintainable intellectual property assets;
provide as input to said predictive model a third series of data comprising selected metrics quantifying said selected characteristics of said particular identified maintainable intellectual property asset of interest and operating said predictive model, by the computer system, to calculate an estimated probability of a maintenance fee payment being made in the future relative to said identified maintainable intellectual property asset of interest;
estimate a value distribution curve, the shape of the curve generally representing an approximated or assumed distribution of value by percentile rankings within a selected population of maintainable intellectual property assets;
use said value distribution curve to estimate a value or value range for said particular identified maintainable intellectual property asset of interest based at least in part on a percentile ranking derived from said estimated probability of said maintenance fee either being paid or not being paid in the future relative to said particular identified maintainable intellectual property asset of interest; and
display or cause to be displayed via a graphical user interface of an Internet web browser a dynamically updateable interactive report, the interactive report comprising an indication of the estimated value or value range for said particular identified maintainable intellectual property asset of interest, the interactive report further comprising a clickable hyperlink generated based on the stored URL address data, the clickable hyperlink configured to cause the graphical user interface of the Internet web browser to display a third-party web page associated with a commercial product related to said particular identified maintainable intellectual property asset of interest.

10. The system of claim 9 wherein said first and second populations of maintainable intellectual property assets comprise selected samples of issued U.S. patents and wherein said maintenance fee payment comprises payment of the first scheduled maintenance fee for each said maintainable intellectual property asset.

11. The system of claim 9 wherein said first and second populations of maintainable intellectual property assets have roughly the same population size.

12. The system of claim 9 wherein said selected metrics comprise one or more characteristics of each said maintainable intellectual property asset in said first and second populations of maintainable intellectual property assets that are determined or assumed to have either a positive or negative correlation with the payment or non-payment of said maintenance fee.

13. The system of claim 9 wherein said predictive model comprises a multiple regression model that correlates multiple individual predictor variables comprising said selected metrics to a single criterion variable comprising the payment or non-payment of said maintenance fee.

14. The system of claim 13 wherein said multiple regression model has the form:

$$CV_m = f\{PV_1, PV_2 \ldots PV_n\}$$

where: $CV_m$=criterion variable
$PV_n$=predictor variables.

15. The system of claim 9, wherein the computing system is further configured to automatically generate a maintenance probability report for said identified selected maintainable intellectual property asset of interest, said report including basic information identifying said selected maintainable intellectual property asset of interest and said estimated probability of said maintenance fee being paid or not being paid within a predetermined period of time in the future.

16. Non-transitory physical computer storage comprising computer-executable instructions stored thereon that, when executed by a hardware processor, are configured to perform a method for dynamically linking a third-party web page to a dynamically updateable Internet-accessible report estimating a value or value range for a particular identified maintainable intellectual property asset of interest related to a commercial product associated with the third-party web page, the method comprising:
   repeatedly monitoring, by an automated web crawler, a plurality of third-party web pages associated with commercial products;
   analyzing data accessed by the automated web crawler to determine associations between the commercial products and intellectual property assets;
   storing in an electronic database URL address data that links the intellectual property assets with third-party web pages having commercial products determined to be associated with the intellectual property assets;
   storing a first series of data comprising selected metrics quantifying certain selected characteristics of a first population of maintainable intellectual property assets for which maintenance fee payments have been made;
   storing a second series of data comprising selected metrics quantifying said selected characteristics of a second population of maintainable intellectual property assets for which maintenance fee payments have not been made;
   constructing a predictive model based on said stored first and second series of data, said predictive model being operable to generate an estimated ex ante probability that is predictive of the maintenance fee payment having either been paid or not paid relative to each intellectual property asset in said first or second populations of maintainable intellectual property assets;
   providing as input to said predictive model a third series of data comprising selected metrics quantifying said selected characteristics of said particular identified maintainable intellectual property asset of interest and operating said predictive model, by the computer system, to calculate an estimated probability of a maintenance fee payment being made in the future relative to said identified maintainable intellectual property asset of interest;
   estimating a value distribution curve, the shape of the curve generally representing an approximated or assumed distribution of value by percentile rankings within a selected population of maintainable intellectual property assets;
   using said value distribution curve to estimate a value or value range for said particular identified maintainable intellectual property asset of interest based at least in part on a percentile ranking derived from said estimated probability of said maintenance fee either being paid or not being paid in the future relative to said particular identified maintainable intellectual property asset of interest; and
   displaying or causing to be displayed via a graphical user interface of an Internet web browser a dynamically updateable interactive report, the interactive report comprising an indication of the estimated value or value range for said particular identified maintainable intellectual property asset of interest, the interactive report further comprising a clickable hyperlink generated based on the stored URL address data, the clickable hyperlink configured to cause the graphical user interface of the Internet web browser to display a third-party web page associated with a commercial product related to said particular identified maintainable intellectual property asset of interest.

17. The non-transitory physical computer storage of claim 16, wherein said first and second populations of maintainable intellectual property assets comprise selected samples of issued U.S. patents and wherein said maintenance fee payment comprises payment of the first scheduled maintenance fee for each said maintainable intellectual property asset.

18. The non-transitory physical computer storage of claim 16, wherein said first and second populations of maintainable intellectual property assets have roughly the same population size.

19. The non-transitory physical computer storage of claim 16, wherein said selected metrics comprise one or more characteristics of each said maintainable intellectual property asset in said first and second populations of maintainable intellectual property assets that are determined or assumed to have either a positive or negative correlation with the payment or non-payment of said maintenance fee.

20. The non-transitory physical computer storage of claim 16, wherein said predictive model comprises a multiple regression model that correlates multiple individual predictor variables comprising said selected metrics to a single criterion variable comprising the payment or non-payment of said maintenance fee.

21. The non-transitory physical computer storage of claim 20, wherein said multiple regression model has the form:

$$CV_m = f\{PV_1, PV_2 \ldots PV_n\}$$

where: $CV_m$=criterion variable
$PV_n$=predictor variables.

22. The non-transitory physical computer storage of claim 16, the method further comprising:
   automatically generating a maintenance probability report for said identified selected maintainable intellectual property asset of interest, said report including basic information identifying said selected maintainable intellectual property asset of interest and said estimated probability of said maintenance fee being paid or not being paid within a predetermined period of time in the future.

* * * * *